(12) United States Patent
Khivesara et al.

(10) Patent No.: US 8,149,771 B2
(45) Date of Patent: Apr. 3, 2012

(54) RELIABLE EVENT BROADCASTER WITH MULTIPLEXING AND BANDWIDTH CONTROL FUNCTIONS

(75) Inventors: Amit Khivesara, Clifton, NJ (US); Xiaofeng Liu, Edison, NJ (US); Peter Andrew Mataga, Sparta, NJ (US); Cary Torkelson, Allendale, NJ (US); Vinod Valloppillil, San Francisco, CA (US); Edgar Villanueva, Rockaway, NJ (US)

(73) Assignee: Roundbox, Inc., Forham Park, NJ (US)

( * ) Notice: Subject to any disclaimer, the term of this patent is extended or adjusted under 35 U.S.C. 154(b) by 648 days.

(21) Appl. No.: 11/626,707

(22) Filed: Jan. 24, 2007

(65) Prior Publication Data
US 2007/0180119 A1 Aug. 2, 2007

Related U.S. Application Data

(60) Provisional application No. 60/763,385, filed on Jan. 31, 2006, provisional application No. 60/816,322, filed on Jun. 26, 2006, provisional application No. 60/868,868, filed on Dec. 6, 2006.

(51) Int. Cl.
*H04W 4/00* (2009.01)
*H04L 12/56* (2006.01)
*G06F 15/173* (2006.01)

(52) U.S. Cl. ............. 370/329; 370/395.4; 370/230; 709/226

(58) Field of Classification Search .............. None
See application file for complete search history.

(56) References Cited

U.S. PATENT DOCUMENTS

| | | | |
|---|---|---|---|
| 5,828,653 A * | 10/1998 | Goss | 370/230 |
| 6,396,816 B1 * | 5/2002 | Astle et al. | 370/264 |
| 6,442,138 B1 * | 8/2002 | Yin et al. | 370/232 |
| 6,590,885 B1 | 7/2003 | Jorgensen | |
| 6,640,248 B1 * | 10/2003 | Jorgensen | 709/226 |
| 6,671,724 B1 * | 12/2003 | Pandya et al. | 709/226 |
| 6,731,625 B1 | 5/2004 | Eastep et al. | |
| 6,754,241 B1 * | 6/2004 | Krishnamurthy et al. | 370/537 |

(Continued)

OTHER PUBLICATIONS

International Search Report for related International Application No. PCT/US07/61036 dated Feb. 5, 2008 (3 pages).

(Continued)

*Primary Examiner* — Jinsong Hu
*Assistant Examiner* — William Nealon
(74) *Attorney, Agent, or Firm* — Kilpatrick Townsend & Stockton LLP

(57) ABSTRACT

A system, apparatus, and method for transmitting data in a broadcast mode to multiple devices operating in a network. The invention enables the efficient utilization of bandwidth while providing a desired level of quality of service for the applications executing on the devices that utilize the broadcasted data. The invention utilizes a set of bandwidth constraints in combination with a set of heuristics and rules for the allocation and re-allocation of bandwidth among multiple applications in a manner that minimizes the impact on the quality of service metrics of importance to the affected applications when contention exists for the network resources. The present invention implements processes to cause the quality of service provided to each application to degrade smoothly, with certain priorities and guarantees being maintained. The present invention also provides event segmentation and reassembly functions for applications, and includes reliability mechanisms to increase the ability to provide data to client devices that have not been actively receiving for significant periods of time.

21 Claims, 15 Drawing Sheets

U.S. PATENT DOCUMENTS

| | | | | |
|---|---|---|---|---|
| 6,820,117 B1 * | 11/2004 | Johnson | | 709/223 |
| 6,871,233 B1 | 3/2005 | Bearden et al. | | |
| 6,940,813 B2 * | 9/2005 | Ruutu | | 370/231 |
| 7,289,964 B1 | 10/2007 | Bowman-Amuah | | |
| 7,409,450 B2 * | 8/2008 | Jorgensen | | 709/226 |
| 7,499,453 B2 * | 3/2009 | Carlson et al. | | 370/395.2 |
| 7,548,534 B2 * | 6/2009 | Zimmerman et al. | | 370/346 |
| 2002/0064149 A1 | 5/2002 | Elliott et al. | | |
| 2004/0010592 A1 * | 1/2004 | Carver et al. | | 709/226 |
| 2004/0013089 A1 * | 1/2004 | Taneja et al. | | 370/235 |
| 2004/0076155 A1 * | 4/2004 | Yajnik et al. | | 370/389 |
| 2004/0151114 A1 * | 8/2004 | Ruutu | | 370/230 |
| 2004/0153545 A1 * | 8/2004 | Pandya et al. | | 709/226 |
| 2004/0228291 A1 * | 11/2004 | Huslak et al. | | 370/260 |
| 2005/0111462 A1 * | 5/2005 | Walton et al. | | 370/395.4 |
| 2007/0198656 A1 | 8/2007 | Mazzaferri et al. | | |

OTHER PUBLICATIONS

International Search Report and Written Opinion mailed Jan. 11, 2010 in Application No. PCT/US09/32344, filed Jan. 29, 2009.

* cited by examiner

RELIABLE EVENT BROADCASTER WITH MULTIPLEXING AND BANDWIDTH CONTROL FUNCTIONS

CROSS-REFERENCE AND PRIORITY CLAIM TO RELATED APPLICATIONS

This application is related to and claims the benefit of the following United States Patent Applications: (1) U.S. provisional patent application No. 60/763,385, entitled "Reliable Event Stream Distributor", filed Jan. 31, 2006; (2) U.S. provisional patent application No. 60/816,322, entitled "Reliable Event Broadcaster", filed Jun. 26, 2006; and (3) U.S. provisional patent application No. 60/868,868, entitled "Reliable Event Broadcaster With Multiplexing And Bandwidth Control Functions", filed Dec. 6, 2006, the contents of which are hereby incorporated in their entirety by reference.

BACKGROUND OF THE INVENTION

The present invention is directed to the distribution of data such as news, events, notifications, files, media-clips and other application data to multiple devices operating in a network, and more specifically, to a system and associated apparatus and methods for efficiently providing and managing the distribution of such data to client devices using a broadcast mode of data transfer. The invention is particularly applicable to the broadcast of data to mobile devices operating in a wireless network where addressing each device individually can be inefficient in terms of network resource usage or technically not feasible due to network bandwidth limitations, although it is understood that the systems, apparatus, and methods discussed are applicable to other devices as well, and may be implemented in such a manner as to involve data transmission over either a wired or wireless network.

Although in portions of the following description the present invention will be discussed with reference to mobile wireless devices operating in a wireless network, it is to be understood that that the inventive systems, apparatus and methods are generally applicable to other types of devices as well, and to networks other than wireless networks (e.g., fixed high-speed bidirectional networks such as an Internet based communications networks, or fixed or wireless bidirectional networks in which communication in one direction is faster than in the other). Applicable devices include, for example, ATM machines, informational kiosks, vending machines, and navigation systems. One example of a situation in which the present invention would be applicable would be an automobile navigation system where there is no or only limited ability for the user device to communicate with the source of the data. Another example is that of an information kiosk that may have limited upstream communications capabilities. In general, the present invention is most applicable to client devices where there is a broadcast mechanism or other efficient data distribution mechanism in one direction (network to many devices), but there is not an efficient/cost-effective or available two-way mechanism to pull data customized for each device. Although the invention provides significant benefits for such networks, as mentioned, in general it may be used in the context of high-speed fixed or wireless bidirectional networks with symmetric or asymmetric communications capabilities.

The increasing adoption of data services by users has resulted in a related increase in the types of such services available, and in the variety of data and applications of interest to those users. Users of mobile wireless devices presently have, or soon will have the ability to receive sports information, news, stock quotes, and real-time data specific to a particular application executing on their device, as well as emergency notifications and location specific data, for example.

However, the use of mobile wireless devices such as mobile phones, PDAs, and wirelessly connected laptop computers introduces certain factors into any system designed to deliver data to applications executing on those devices, where some of the factors may not be significant or relevant in a fixed high-speed bidirectional communications system (such as an Internet based communications system). For example, a situation in which a mobile device must communicate with a central data store or server over a wireless network may introduce bandwidth constraints, latency concerns, intermittent connectivity problems, and prohibitive cost into any system designed to transfer data and content to a user of a client device. In addition, the lower available bandwidth as compared to a high-speed wire line network may place constraints on the type or complexity of the data or content that can be effectively delivered. Also, mobile networks typically can not handle a large number of simultaneous client-initiated unicast (i.e., individually addressed server to client communications) transactions without severe adverse impact on other network traffic. Similarly, latency and intermittent connectivity concerns may impact the ability of the client device to communicate with a source of data or content to confirm delivery of content. In addition, mobile and other specialized devices typically have characteristics that impose constraints on the storage and processing of data that are not present when using desktop computers or other devices connected to a high speed bidirectional network. These constraints may include display size and resolution, data processing speed, and data storage capacity.

As a result, a threshold issue in determining how best to deliver data to a device is that of the mode of data transfer used for communications between intended recipients and the network infrastructure. In many types of networks, communications between the network infrastructure and individual users may be accomplished by either a point-to-point communication or by the broadcast of data to a group of recipients. Each method of data transfer has certain advantages and associated disadvantages, both with regards to optimal network infrastructure usage and with regards to enabling effective use of the type of data being transferred.

For example, point-to-point communications are most efficient for a relatively small group of recipients, as they may require significant infrastructure overhead in terms of recipient device addressing, allocation of dedicated bandwidth, and management of requests from devices and the related processing of responses to those requests. Another disadvantage of point-to-point communications is that the cost in terms of network resources and overhead is proportional to the number of client devices receiving the transmission, so that costs generally scale directly with the number of recipients.

In contrast, broadcasting data to a larger group of recipients may be more cost-effective and a better way to allocate network infrastructure resources in certain situations and with regards to certain types of data. Broadcasting provides benefits in terms of efficiency and scalability, and the cost for broadcasting data is not directly proportional to the number of recipients. Broadcasting enables data to be delivered efficiently to a larger group of recipients without the need for communicating client-side requests to a server and may be more efficient in terms of resource usage for certain types of applications. Broadcasting is capable of providing comparatively lower cost per bit of data transferred, and for certain applications may be a more practical and effective means of delivering data to interested users.

The type of data or application for which the data is intended may also introduce factors that should be considered in deciding upon the desired mode of data transfer. Certain types of applications require asynchronous, simultaneous distribution of data to a large set of clients. These applications include, but are not limited to, safety alerts, emergency notifications, traffic and extreme weather updates, sporting event updates, news updates, stock quote updates, or other data that is of potential interest to a large group of users and is time sensitive or whose value dissipates rapidly. For such applications, it may be more important to provide the relevant data to a region or section of a network's coverage than to respond to only those users who specifically request the data. In addition, in situations of intermittent or unreliable coverage, the time and network resources required for processing a request-response interaction may not be available when needed.

For these and other reasons, and particularly for bandwidth-constrained data distribution networks such as many mobile data networks, it is often advantageous to utilize a broadcast mode for distribution of events or data. Note that as used herein, the term "events" or "data" refers to data of arbitrary size and type that is meaningful or relevant to the application receiving the data. Examples include a message intended to be displayed to the user of the receiving application, data to be presented within an application (e.g., news, weather, sports information or updates), a video clip to be played to the user, or a data update for the application. Some applications may depend on data and/or events being received and processed reliably and in sequence, in contrast to applications such as streaming media that are designed to be more resilient to situations in which there are missing data packets. In addition, sometimes data and/or events are spaced apart far enough in time that applications expect individual notifications as data and/or events arrive, rather than processing a buffered stream of data.

An important consideration in designing a data delivery system for mobile devices connected to a wireless network, or more generally for devices connected to networks other than high-speed bidirectional networks, is that of providing the data in a way that is effective for the end user's intended use while being efficient for a network operator. In this sense, network operator "efficiency" generally involves consideration of the optimal use of limited or constrained network resources. These resources include bandwidth (and related data transfer resources) and data processing resources (as might be used to process request-response interactions with client devices). Further, "effective for the end user's intended use" refers to data that is timely and is presented in a manner that makes its consumption by the user desirable.

As noted, whether using a point-to-point or broadcast mode of data transfer, an important consideration is the efficient use of network resources, primarily bandwidth and data processing resources. Bandwidth is a limited and valuable commodity, whether being used in a point-to-point mode to transfer a request from a client to a server or to transfer a response to that request (e.g., data in the form of text, audio, video, multi-media, notifications, etc.) to a client device. Similarly, even in a broadcast mode bandwidth is still an important resource because data is being transferred by a number of serving applications to a large number of client devices, some of which may or may not be interested in the data for any particular application broadcasting data. In addition, data processing resources such as those required to receive and process client requests can become a significant burden on a network if a large number of client devices are sending requests or data to a central server within a relatively small timeframe.

Because bandwidth is a limited resource, it needs to be efficiently allocated between multiple users and between multiple applications that utilize that bandwidth to provide data services to those users. Typically, there are two basic modes of bandwidth usage for multiple applications; dedicated and shared. Dedicated refers to an approach where a fixed amount of bandwidth is made available to each application, with each such application being able to utilize that bandwidth as desired. Sharing refers to an approach where multiple applications share an amount of bandwidth, with certain rules or heuristics being applied to negotiate between the potentially conflicting bandwidth demands of those applications.

Although allocation of bandwidth between a variety of applications and users of those applications can be based on different approaches, determining which approach to use will typically take into consideration the following factors: the type of data or application and how best to deliver and present that data; the bandwidth requirements of the data, both on average and during periods of increased demand; and how best to alter the initial allocation of bandwidth without compromising a desired or required quality of service (QoS) for that application.

For example, dedicating bandwidth to non-streaming data applications (i.e., those other than streaming audio or video, for example) is not an efficient way to allocate such a resource. This is because such applications do not fully utilize the allotted bandwidth over an extended period of time. They are often idle, and when requiring bandwidth may need to send data in a burst. Thus, the traditional method of dedicating a broadcast channel to such an application is inefficient when it comes to fully utilizing the limited bandwidth available in the network.

As mentioned, instead of dedicating a portion of the available bandwidth to each application, another possible approach is to permit multiple applications to share an amount of bandwidth. However, implementing a shared bandwidth model presents significant challenges. This is because the applications sharing the bandwidth need to cooperate to properly share the bandwidth resource. In addition, the network operator may require a set of rules or heuristics in order to resolve any conflicts that arise between the bandwidth demands of multiple applications. For example, multiple applications may need to transmit data at the same time, or may not be able to be constrained to the bandwidth limitations assigned to them. This may cause an attempt to use more network bandwidth resource than is physically available to the system because applications do not know how other applications are using the same network resources, and if they do, can not reasonably know about the usage patterns of the other applications during a broadcast session (where the usage patterns may introduce demands on bandwidth that exceed the amount allocated).

A possible approach that modifies a baseline bandwidth sharing model is to permit multiple applications to share bandwidth and introduce a prioritization scheme to the data to be transmitted, in conjunction with a policy that causes the highest priority event to be broadcast next over the network. This may be accomplished by "tagging" data packets with a priority indicator to identify those packets which should be sent first from a queue, followed by those with a lower priority. This approach better utilizes the shared resource than the baseline sharing method since idle applications do not waste bandwidth that might otherwise be utilized. However, it is not an optimal solution as data with a lower priority may never be sent or may be delayed sufficiently to render its delivery ineffective. This is because it is possible using this approach to "starve" lower priority applications of needed bandwidth if higher priority applications place a sufficient demand on network resources. This approach is also somewhat inflexible, since once packets are tagged with a priority indication, the relative priority cannot be changed (and hence the relative delivery order cannot be altered). Further, when packets need to be dropped from the transmission schedule due to high traffic conditions, there is no meaningful way to determine which packets to drop and which to broadcast.

What are desired are a system, apparatus, and method for efficiently using a broadcast mode of data transfer to manage the distribution of data to a variety of applications executing on multiple client devices operating in a network, where such system, apparatus, and method overcome the noted disadvantages of existing approaches.

BRIEF SUMMARY OF THE INVENTION

The present invention is directed to a system, apparatus, and method for transmitting data in a broadcast mode to multiple devices operating in a network. The invention is designed and implemented in a manner that utilizes network resources, such as bandwidth, efficiently while providing a desired level of quality of service for the applications executing on the devices that utilize the data.

The invention provides a way for multiple applications to share bandwidth in a more optimal way than provided by typical bandwidth sharing approaches. This functionality results from the recognition by the inventors that certain types of applications can operate effectively with "soft real-time" requirements for bandwidth allocation, thereby permitting a certain amount of negotiation and bandwidth (re)allocation to be utilized to satisfy the potentially conflicting demands of multiple applications. The invention utilizes a set of bandwidth constraints in combination with a set of heuristics and rules for the allocation and re-allocation of bandwidth among multiple applications in a manner that minimizes the impact on the quality of service metrics of importance to the affected applications. In the context of the present invention, individual applications are for the most part unaware of the multiplexing of multiple bandwidth requests, except when they compete for bandwidth, and in this case, if necessary, the present invention implements processes to cause the quality of service provided to each application to degrade smoothly, with certain priorities and service guarantees being maintained.

In order to utilize most broadcast data networks, data traffic must be broken into packets. In this regard, the present invention provides event segmentation and re-assembly functions for applications. Because broadcast distribution is (or may be) one-way and unreliable and generally lacks a mechanism to guarantee that a receiver is listening at the time an event is generated (e.g., because reception is not continuous or because the client has joined a broadcast mid-stream), the invention also includes reliability mechanisms to increase the ability to provide data to client devices that have not been actively receiving a broadcast for its entirety.

In one embodiment, the present invention is directed to a method of allocating bandwidth of a communications system among multiple applications using the communications system to transfer data. The method includes determining a value for the aggregate bandwidth $B_A$ available to all applications, determining a first bandwidth limit $B_1$ for each application, wherein $B_1$ represents a minimum guaranteed bandwidth limit, determining a second bandwidth limit $B_2$ for each application, wherein $B_2$ represents an expected bandwidth limit that is not less than the first bandwidth limit, and determining a relative priority level for each application, where the relative priority level has a value $P_i$, and, $P_{<i}$ represents all priority levels less than $P_i$, and $P_{>i}$ represents all priority levels greater than $P_i$. The bandwidth limits satisfy the relationships that the sum of $B_1$ for all applications does not exceed $B_A$, and for each relative priority value, $P_i$, the sum of $B_2$ for each application at priority level $P_i$ plus the sum of $B_1$ for each application at priority $P_{<i}$ does not exceed $B_A$. The inventive method allocates bandwidth to each of the applications, where the bandwidth allocation satisfies the relationship that the sum of bandwidth allocated to all applications does not exceed $B_A$.

In another embodiment, the present invention is directed to an apparatus for delivering data to a plurality of client devices over a communications network, where the apparatus includes a registration element configured to register an application, the application providing data to be delivered to the client devices, a bandwidth allocation element configured to allocate bandwidth of the communications network to the application, a communications network formatting element configured to format the provided data for transport over the communications network, and a communications network control element configured to provide the formatted data to the communications network for transport over the communications network.

In another embodiment, the present invention is directed to an apparatus for receiving data transported over a communications network intended for an application executing on the apparatus, where the apparatus includes a registration element configured to register the application, a data assembly element configured to process data received from the communications network, the data assembly element producing an event from one or more data packets, a cache configured to store the received data, and a scheduling element configured to determine when to provide the event to the application.

In another embodiment, the present invention is directed to a system for the delivery of data over a communications network to a client application, where the system includes a server apparatus and a client device. The server apparatus includes a registration element configured to register a server application, the server application providing data to be delivered to the client application, a bandwidth allocation element configured to allocate bandwidth of the communications network to the server application, a communications network formatting element configured to format the provided data for transport over the communications network, and a communications network control element configured to provide the formatted data to the communications network for transport over the communications network. The client device includes a registration element configured to register the client application, a data assembly element configured to process data received from the communications network, the data assembly element producing an event from one or more data packets, a cache configured to store the received data, and a scheduling element configured to determine when to provide the event to the client application.

In another embodiment, the present invention is directed to a method of distributing data to multiple client devices over a communications network, where the method includes registering an application to provide data to the client devices, allocating bandwidth of the communications network to the application, processing data provided by the application for transport over the communications network, transporting the processed data over the communications network, and where for each client device, the method includes registering a client application with the client device, receiving the data after transport over the communications network, caching the data in a storage medium, scheduling delivery of the data, and providing the data to the client application.

Other objects and advantages of the present invention will be apparent to one of ordinary skill in the art upon review of the figures and accompanying detailed description of the present invention.

DETAILED DESCRIPTION OF AN EMBODIMENT OF THE INVENTION

Figure 1:
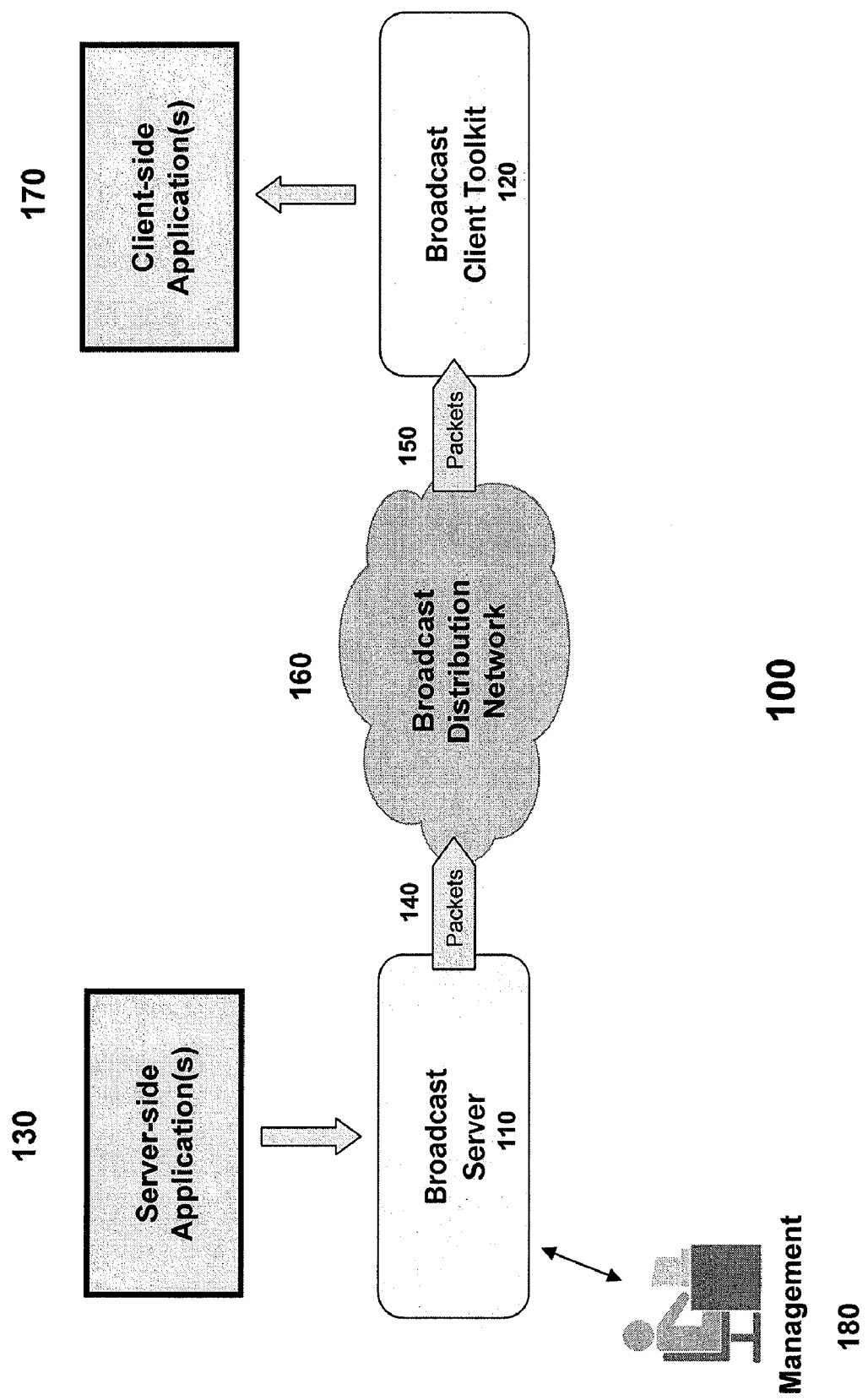
FIG. 1 is a block diagram illustrating the primary functional elements of the system architecture of the present invention.

In order to make the following discussion of the embodiments and benefits of the present invention better and more fully understood, it is useful to introduce certain terms and definitions that will be used. It is to be understood that these terms and definitions are introduced for purposes of clarity and not to place restrictions or constraints upon the embodiments of the invention or the claimed invention.

In the discussion of the present invention, the following terms will be understood to have the following general meanings:

Carousel. A carousel is a collection of events that are continually broadcast. When the last event in the carousel is broadcast, broadcast continues with the first event in the carousel. Events may be placed on, or removed from the carousel at any time. Each application using broadcast services is allocated one or more carousels. Using multiple carousels enables an application to prioritize different classes of events that it broadcasts.

Events on a carousel do not necessarily need to be delivered in a set order, such as first in, first out. Items on a carousel can be broadcast in an arbitrary order either by moving or placing events at the front of the queue, or tagging events using some type of priority system that determines which event will be the next to be broadcast.

Carousel Size. The size of a carousel is determined by the size and number of events contained on the carousel. Along with the carousel's allocated bandwidth, carousel size determines how frequently an event on a carousel can be broadcast.

Carousel Cycle Time. The carousel cycle time is the amount of time needed to broadcast the entire contents of the carousel. The carousel cycle time is dependent on the size of the carousel and the bandwidth allocated to that carousel.

Carousel Bandwidth. The carousel bandwidth is the rate at which data is broadcast for the carousel.

Linger Time. Linger time is the amount of time an event remains on a carousel. Linger time, along with the carousel's cycle time, determines how many times an event gets (re)broadcast.

Broadcast Manager. The broadcast manager is responsible for pulling packets off each carousel for delivery over the broadcast distribution network. The broadcast manager gets the priority of each carousel from the corresponding session policies, and uses that information to determine the rate which data is pulled off each carousel.

Event Scheduler. The event scheduler determines the priority of each carousel, and places or removes events from each carousel based on the requirements and priority of those events. If an application has more than one carousel, the scheduler may also move events between those carousels.

Intake Manager. The intake manager receives events from applications to be broadcast over the network. If data compression is to be used, the intake manager compresses the event. Event tags may be added to the event in order to assist with functions such as in-order delivery. Events are passed on to the event scheduler for placement on the appropriate carousel.

Latency. Latency refers to the time between when an event is placed on a carousel and the time the event is fully broadcast for the first time.

Broadcast Server. The broadcast server provides a mechanism for applications to broadcast events over the broadcast network. Applications need not be aware of the other applications sharing the broadcast resources, nor of the methods, protocols, and other mechanisms used to actually broadcast the data over the broadcast medium. The broadcast server provides and/or manages functions such as reliable delivery, compression, prioritization, and bandwidth control.

Broadcast Client Toolkit. The broadcast client toolkit provides a set of APIs to applications running on a client device. The APIs allow client applications to register to receive events from applications using the broadcast network.

Event. An event is a piece of data of arbitrary size and type that is meaningful to the application receiving the event. Events can be files, notifications, alerts, media clips, or other data objects. Events may be sent one after another or only occasionally, depending on the application.

Session. A session is setup whenever an application has events to distribute. Sessions have certain characteristics that determine how events using the channel get broadcast. These characteristics include parameters such as latency, reliability, and linger time.

Segmentation. Events that applications wish to send may be larger than the maximum packet size of the underlying broadcast network. In such cases, events must be broken up into chunks that will fit the maximum packet size. This process is referred to as segmentation.

Reassembly. Reassembly is the process of combining multiple packets to reconstruct the original event being transmitted.

Rebroadcast. Rebroadcast is the process of sending the same event multiple times over the network so as to allow receivers that may not be continually listening to the network to receive the event.

FEC. Forward Error Correction is a system of error reduction for data transmission, whereby redundant data is sent in addition to the broadcast data. This allows the receiver to detect and correct certain errors without the need to ask the sender to retransmit the data. The advantage of forward error correction is that retransmission of data can often be avoided (at the cost of higher bandwidth requirements on average) and is therefore applied in situations where retransmission would be relatively costly or impossible, such as mobile broadcast networks.

Multiplexing. Multiplexing is the process by which multiple applications share the same broadcast resource. Events from multiple applications are interleaved on the broadcast network in such a way that one application does not prevent another application from receiving a minimal amount of bandwidth or other network resources.

Quality of Service (QoS). QoS refers to (among other possible definitions) the probability that an event will be successfully delivered within the desired period of time.

Aggregate Bandwidth. The aggregate bandwidth is the total bandwidth available to the network operator for all applications using the same network resource.

Minimum Guaranteed Bandwidth. The minimum guaranteed bandwidth is the minimum bandwidth an application session is guaranteed for the delivery of events. During normal operation where there are no higher priority events or notifications being broadcast by other applications, the actual bandwidth available to the application will typically be greater than the minimum guaranteed bandwidth. The minimum guaranteed bandwidth is generally not intended to be sufficient for an application to operate normally for significant periods of time. It is used to guarantee that an application never gets starved out due to traffic requirements by higher priority applications.

Maximum Allowable Bandwidth. The maximum allowable bandwidth is the maximum bandwidth an application session will be allocated even if no other applications are using the broadcast resource. The maximum allowable bandwidth could be equal to the aggregate bandwidth, though an operator may set this lower for other reasons.

Expected Bandwidth. The expected bandwidth is the bandwidth an application is guaranteed to receive as long as there are no higher priority events in the system. Applications at the same priority level or below are not allowed to cause an application to get less than its expected bandwidth. Higher priority applications are allowed to preempt this bandwidth, but it is not meant to occur on a long term basis. Applications should be prepared to be preempted for a short period of time.

Allocated Bandwidth. The allocated bandwidth is the bandwidth at which an application is currently allowed to operate. It may be one of the thresholds defined above, or any value in between. If an application is using less than its allocated bandwidth, it can make the difference available to other applications in the system with the assurance that it can ask for it back at a later time. An application can not use more than its allocated bandwidth, but it can ask for more if needed. If the bandwidth is available, it will be allocated to the application under the condition that it may be taken away later. The allocated bandwidth is dynamic, and can change over time based on other applications' activity.

The present invention is directed to a system, apparatus, and associated methods for delivering data to applications executing on multiple devices by using a broadcast mode of data transfer. The invention is typically implemented in a client-server architecture wherein a set of instructions are executed on both the client and server elements. One feature of this architecture is that both the network operator and application developer derive benefits; it permits the operator to control and optimize network resource usage while insulating application developers from details regarding the operation or operational status of the broadcast network.

The invention enables applications in a broadcast environment to distribute events, notifications and other data reliably in real-time to a large number of receivers while efficiently sharing limited bandwidth resources with other applications using the same broadcast network. Applications need not be aware of the other applications sharing the resources, nor of the methods, protocols, or other mechanisms used to broadcast the data over the broadcast medium. Applications can be guaranteed a minimal level of quality of service (QoS), while network operators retain control over the usage of the network infrastructure and resources.

In one embodiment, the invention is implemented in the form of a client-server architecture that includes a Broadcast Server (BS) and a Broadcast Client Toolkit (BCT). Server-side applications that serve data, send notifications, or distribute events register with the Broadcast Server. Client applications that wish to receive such data, notifications, or events register with the Broadcast Client Toolkit. The Broadcast Server and Broadcast Client Toolkit work together to reliably and efficiently transmit data, notifications, and events over the broadcast network for the relevant applications. The Broadcast Server and Broadcast Client Toolkit components provide functions that may include event segmentation and re-assembly, data transfer reliability in the form of error correction and retransmission, data compression, event prioritization, in-order delivery, and feedback as to the expected performance of the network. In addition, the Broadcast Server provides a benefit to the operator of the broadcast network, since it acts as a gatekeeper and controller for the way in which applications are allowed to make use of the network resources.

The invention includes reliable and efficient methods to enable applications to deliver events to a large population of devices over a shared broadcast network. Applications are shielded from many of the details involved in delivering events over the network and from needing to know about other applications sharing the same broadcast network. The Broadcast Sever and Broadcast Client Toolkit provide a set of features to applications to optimize the quality of service of each application and for the overall system operation. The Broadcast Server (BS) provides server-side applications with the ability to publish events that can be reliably broadcast over the network and received by a large number of clients. Client-side applications utilize the Broadcast Client Toolkit (BCT) to subscribe to and receive those events.

Although the primary elements and respective functions of the Broadcast server and Broadcast Client Toolkit will be discussed in greater detail, the following is a brief overview of those elements and their operation within the inventive system. The Broadcast Server provides the mentioned features and capabilities through a number of components. For example, a set of application policies may be created by the network operator or other manager using the Policy Manager element. The application policies may define bandwidth limits for each application using the services provided by the Broadcast Server. They may also define priorities and/or processes that determine how applications share and are individually allocated the available bandwidth.

The application policies are used by the Session Manager and the Event Scheduler elements. The Session Manager element is responsible for setting up sessions for applications wanting to publish events (i.e., data). The Event Scheduler element is responsible for scheduling events to be broadcast, and determines the quality of service (QoS) provided to each application currently using the system. The Intake Manager element is responsible for receiving new events to be broadcast from applications, and may compress those events or tag them with additional information to assist other parts of the system. Each application session is assigned an event carousel, which contains the events to be broadcast for that application. Session policies are used to define the characteristics of each carousel, such as its currently allocated bandwidth, bandwidth limits, and quality of service policies.

The Session Manager element sets the initial session policy when an application initiates a session, and the Event Scheduler element may then modify a session policy as needed based on new events entering the system or changes in application policies. The Packet Manager element breaks events into packets and formats them for delivery over the broadcast network. This may include adding forward error correction (FEC) to support the quality of service defined in the relevant session policy. The Broadcast Manager element controls the actual broadcast of event packets over the network, which is accomplished by retrieving packets from the appropriate carousel based on the session policies in effect.

The Broadcast Client Toolkit (BCT) provides a common service and access point for all applications running on a client device though a number of components. Application policies may be set up by the Client Session Manager element as applications register to receive events from one or more event sources. The application policies describe what event sources each application is registering for (i.e., wants to receive events/data from), and other session information or service requests, such as the need to receive events in order. Packets from the broadcast network are received by the Reassembly Manager element and stored in the client event cache. When all packets for an event are received, the Reassembly Manager element notifies the Event Manager element. The Event Manager element inspects the event's tags or other relevant meta-data to determine if it should forward the event to applications registered to receive that event. If it determines that forwarding is appropriate, then the Distribution Manager element strips away tag information or other meta-data and delivers the event to applications registered to receive events from the source (server side) application. Once the applications finish with the event, the Event Manager element may control its removal from the cache.

Note that in the following more detailed discussion and description of the figures, certain elements in different figures may be represented by the same numbers. In such a case, the element referred to is intended to represent the same or equivalent element in the figures and, where applicable, with regards to the accompanying description for those figures.

FIG. 1 is a block diagram illustrating the primary functional elements of the system architecture 100 of the present invention. As shown, the basic architecture includes a server element 110 (referred to as a "Broadcast Server" (BS)) and a client element 120 (referred to as a "Broadcast Client Toolkit" (BCT)). In operation, one or more applications 130 (referred to as Server-side Application(s) in the figure) register with Broadcast Server 110 to provide data in the form of packets 140 to a client device on which Broadcast Client Toolkit 120 is executing. The data packets 140 are transferred over Broadcast Distribution Network 160, exiting the network as data packets 150 which are received by one or more client devices. One or more applications 170 (referred to as Client-side Application(s) in the figure) register with each Broadcast Client Toolkit 120 to receive data from applications 130. As shown in the figure, the server side applications in effect publish data for Broadcast Server 110 to manage the distribution of via the network to the client side applications through the intermediary of Broadcast Client Toolkit 120. Policies for the usage of network resources and other administrative tasks may be provided by a network operator or other management function 180.

As will be described in greater detail, Broadcast Server 110 and Broadcast Client Toolkit 120 perform multiple functions that enable the inventive system to efficiently manage network resources while providing a desired level of quality of service to users.

For example, among other functions, Broadcast Server (BS) 110 may provide the following capabilities:

Segmentation of data/events into packets that conform to the characteristics of the underlying network transport methods and elements;

Use of Forward Error Correction (FEC) for increased reliability of data transfer;

Intelligent re-broadcast of events to clients to increase likelihood that all clients receive those events;

Intelligent bandwidth sharing (allocation and re-allocation) processes for all applications using the broadcast network;

Network operator control for defining application and implementing data transfer and bandwidth usage policies;

Graceful and application aware handling of the implementation of Quality of Service (QoS) changes; and Implementation of processes to ensure in-order delivery of events.

Similarly, among other functions, Broadcast Client Toolkit (BCT) 120 may provide the following capabilities:

Permitting client applications to register to receive events from one or more server-side applications;

Reassembly of events from packet data received from the broadcast network;

Caching of events and delivery of events in-order when requested; and

Delivery of the same event/data to multiple client applications executing on the same client.

Figure 2:
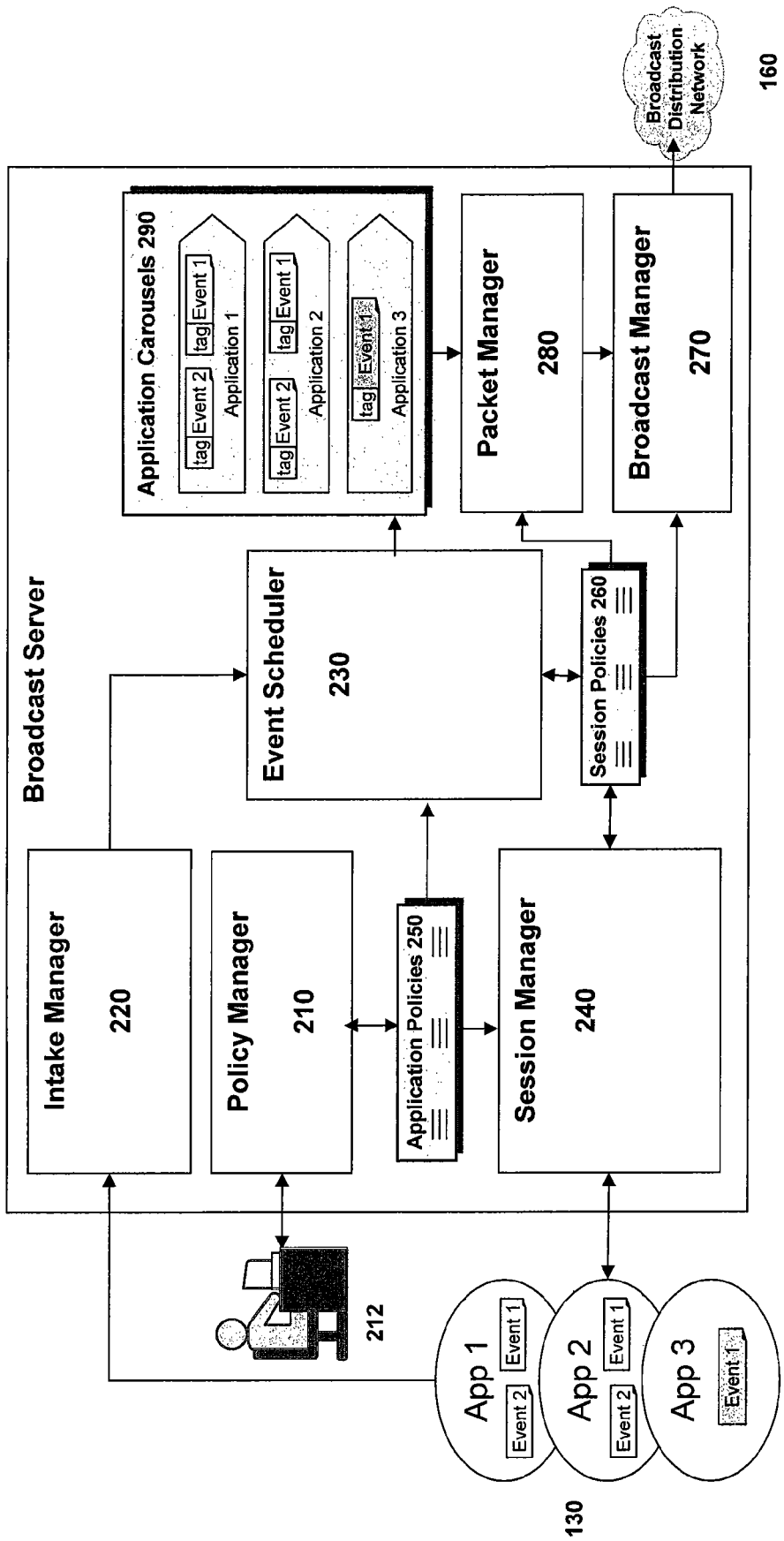
FIG. 2 is a block diagram illustrating the primary functional elements of the Broadcast Server element of the present invention.

FIG. 2 is a block diagram illustrating the primary functional elements of the Broadcast Server 110 element of the present invention. Broadcast Server (BS) 110 generally performs the functions necessary to enable an application to provide data, content, notifications, etc. to a set of users via broadcast over a network 160. The network is operated and/or managed by another entity and that entity will be concerned with at least two primary objectives: (1) effective delivery of the data, etc. in a manner that provides value for the recipients and satisfies any obligations to the applications (or the applications' owners/managers) regarding quality of service or other service indicia; and (2) the cost-effective and efficient use of network resources between multiple such applications and recipients. Broadcast Server 110 enables the network entity to achieve these objectives in a manner that is essentially transparent to the applications themselves, so that such applications require no or only limited knowledge of the network or other applications that may be requesting network resources.

As shown in FIG. 2, Broadcast Server 110 typically contains multiple functional elements. Although these elements are shown in the figure as individual blocks, note that some or all of the functions they perform may be incorporated into other blocks, resulting in a fewer or greater number of such functional elements in the server.

Broadcast Server 110 includes Policy Manager 210 which functions to define and assist in the implementation of the network resource allocation and sharing policies, and provides data on actual bandwidth (and other network resource) usage by applications. The policy or policies defined by Policy Manager 210 may be created by a network operator, administrative entity, policy manager, or management function 212, either independently of or in conjunction with the applications and/or network.

Policy Manager 210 provides a network operator or other management entity with the ability to create and modify application policies, which in turn determine network resource allocation and sharing between multiple applications. The policy manager also reports historical and real-time application resource usage to support billing, resource allocation based on bidding or other business models, and refinements of future policies. As a result, a network operator is provided with the ability to modify application policies in real-time based on these reports, independently or in conjunction with other network resource usage or allocation considerations. Policy Manager 210 further functions to ensure that the policies and resource allocation decisions being implemented are consistent and do not create conflicts, such as would result from certain allocations of bandwidth or other resources. As an example, Policy Manager 210 ensures that the sum of the minimum guaranteed application bandwidths for all applications does not exceed the total bandwidth available.

As noted, application policies permit the network operator to control how bandwidth is allocated among multiple applications, each of which may have independent bandwidth requirements. One function is to ensure that the applications do not exceed the aggregate bandwidth allocated to the group of applications. Additionally, bandwidth management as implemented by Broadcast Server 110 can be used to provide finer levels of control over resource allocation to individual applications. For example, a network operator may choose to limit the amount of bandwidth an application can utilize even if greater bandwidth is available to that application. Similarly, instead of limiting applications' bandwidth usage, the operator may permit applications to exceed their minimum bandwidth allocation and charge for the additional bandwidth used, based on a previously negotiated arrangement (such as an option or first right to purchase arrangement), pseudo real-time bidding, or another form of business model. In such a case, excess available bandwidth may be allocated to the highest bidder, in accordance with the terms of the agreement, etc.

Network operators are also enabled to monitor operating bandwidth for each application in real-time, and can introduce policy changes effectively in real-time. Note that application policy changes may affect the bandwidth available to other applications, not just the one(s) whose policy was changed. In such a case, the effected applications may be notified of the changes so that they can react accordingly, consistent with any relevant priorities or policies.

Continuing with the description of the elements of Broadcast Server 110, the server further includes Session Manager 240. When an application 130 has one or more related events to broadcast, it sets up a session using Session Manager 240. Based on the application's requirements, expected resource usage and any relevant policies, Session Manager 240 creates an event carousel 290 for the application and sets the carousel's bandwidth parameters. The initial bandwidth allocated to the session is a function of event size and frequency, among other things, but may be constrained by the application policies set up by the network operator or by the current bandwidth usage of other applications using the system. Session Manager 240 also operates to notify applications of any quality of service (QoS) changes, which enables those applications, if desired, to initiate changes to the delivery of the data and events affected.

Broadcast Server 110 further includes Intake Manager 220. Intake Manager 220 provides an interface for applications using a session. Applications pass data/events etc. to be broadcast to Intake Manager 220. Intake Manager 220 functions to compress the events, if desired, and may add tags, such as timestamp and sequence numbers, to the event for use by Broadcast Server 110 and Broadcast Client Toolkit 120. The data/event etc. is then passed to Event Scheduler 230 for placement on the appropriate application carousel 290.

Broadcast Server 110 also includes Packet Manager 280 which breaks events into packets that fit the underlying broadcast network. Depending on the broadcast technology used, information may need to be added to the packets to facilitate reassembly at the Broadcast Client Toolkit. Packet Manager 280 checks the session/carousel policy 260 to determine if FEC (forward error correction) is being used to increase broadcast reliability, and provides that function if requested.

Broadcast Manager 270 communicates with Packet Manager 280 to let that element know which application carousel 290 to obtain packets from. Broadcast Manager 270 receives the data packets to be broadcast from Packet Manager 280 and is responsible for sending packets to broadcast network 160. Broadcast Manager 270 uses the session/carousel policies 260 set up by Event Scheduler 230 to determine which packets to send, and requests those packets from Packet Manager 280.

Packet Manager 280 retrieves events from the specified carousel 290 and generates packets to give to Broadcast Manager 270. Packet Manager 280 will typically maintain state data so that it can satisfy future requests for the same carousel since Broadcast Manager 270 may not request enough packets to retrieve an entire event. In this regard, Packet Manager 280 may operate in one of several ways. It can have packets ready to go by breaking up events ahead of requests. This requires that the packets be stored until requested, but allows the Packet Manager to more quickly satisfy requests. Alternatively, the Packet Manager can create packets on an as-needed basis.

Increased event reliability may be accomplished through forward error correction (FEC) and data retransmission. At the cost of some bandwidth, FEC increases the likelihood that a particular event is received error-free and can be used as intended. Retransmission allows the receipt of events in cases where a client is not listening to the broadcast when the event is first available. An application may take advantage of one or both of these reliability mechanisms, depending on its needs. For example, if an application's events build upon information sent in prior events, it is important to make sure clients receive those prior events. In that case, the application may choose to retransmit events frequently to increase the likelihood that clients receive all events.

Using Intake Manager 220, the Broadcast Server may tag events depending on the application requests. Some tags are used only by the Broadcast Server, and are not broadcast with the event to the Broadcast Client Toolkit resident on the client device. An example of this might be a timestamp indicating when the event should be removed from the carousel, or a broadcast count that specifies how many times an event has been broadcast. Other tags may be included with the event for use at the Broadcast Client Toolkit. An example of this would be a sequence number that can be used to ensure in-order delivery. Neither the application sending the event nor the application(s) receiving the event need be aware of the tags.

Figure 3:
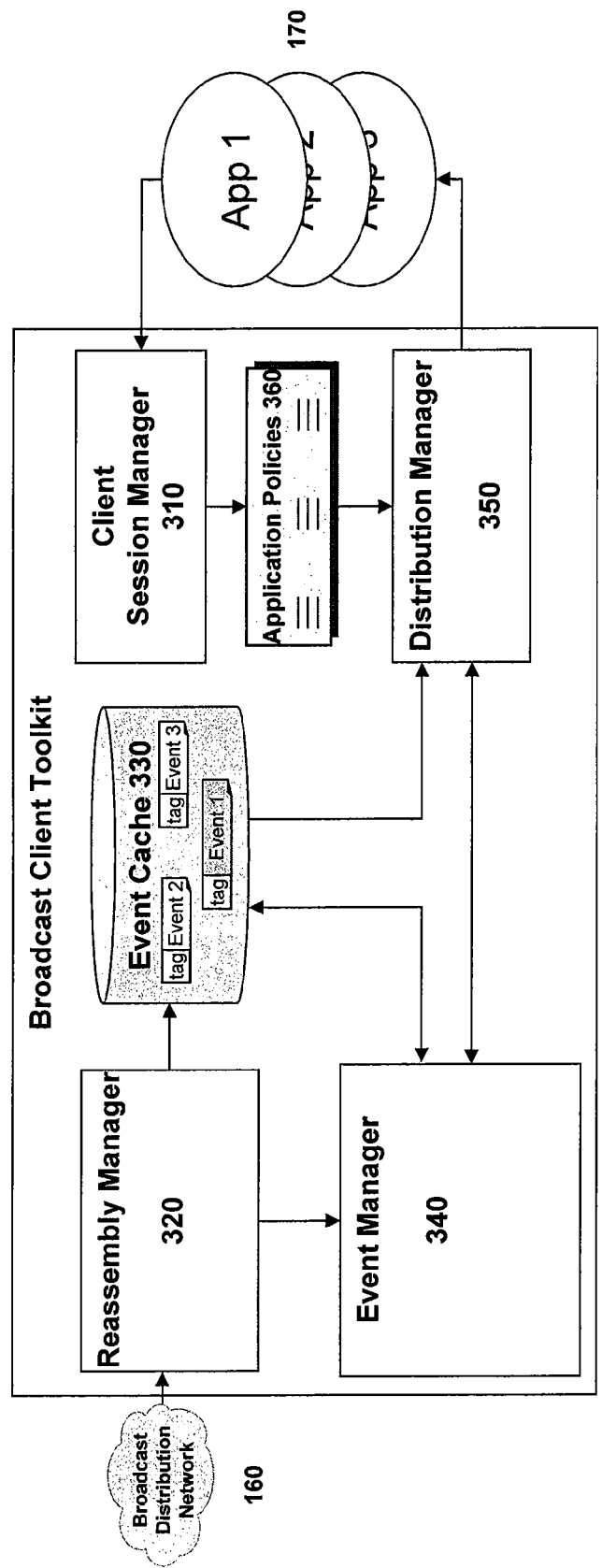
FIG. 3 is a block diagram illustrating the primary functional elements of the Broadcast Client Toolkit element of the present invention.

FIG. 3 is a block diagram illustrating the primary functional elements of the Broadcast Client Toolkit 120 element of the present invention. In operation, an application resident on the client device 170 registers with Broadcast Client Toolkit 120 to inform Toolkit 120 that it is available to receive events. This registration is accomplished via Client Session Manager 310. Applications can register to receive events from one or more sources. An important feature is the ability for multiple applications to receive events from the same source. In this regard, only one copy of the event needs to be broadcast and cached to support multiple applications. The event is maintained until all applications registered to receive that event have finished with it. Based on the applications that register with Session Manager 310, certain application policies 360 may be applied to affect how data is provided to or presented by an application. Such policies 360 may include, for example, a priority scheme for the registered applications, etc.

Reassembly Manager 320 receives packets from broadcast network 160 and reassembles them into the original event. Reassembly Manager 320 may use FEC to reliably re-assemble the events. Partially re-assembled events may be stored for a period of time. If the event is not fully re-assembled in a predetermined amount of time, the partial portion of that event may be removed from Event Cache 330. When an event is fully re-assembled, Reassembly Manager 320 notifies Event Manager 340 so that the event can be processed.

Event Manager 340 processes received events to determine whether or not to forward the event to an application. This involves examining event tag information for sequence numbers, time stamps, or other data describing the event or how it is to be provided. The tag data may be used along with the application policies to determine when an event is ready to be given to an application. For example, if in-order deliver is requested, the event manager will retain events received out of order and only forward them to applications when the earlier events have been forwarded. When Event Manager 340 determines that an event is ready to be forwarded to an application, it informs Distribution Manager 350. When an event is no longer needed by an application on the client device, Event Manager 340 controls the removal of the event from Event Cache 330. Since multiple applications may be receiving the same event, Event Manager 340 tracks the needs of each application using the event to determine when it can be removed from the cache.

Distribution Manager 350 is responsible for the distribution of events to applications 170 that have registered to receive those data/events. It will inform an application that an event is available and supply that event, without tag data, when the application requests it. When the application has finished with the event, Distribution Manager 350 will inform Event Manager 340 so that the Event Manager can determine whether or not to remove the event from Event Cache 330.

The preceding description of the overall system architecture and primary functions of the Broadcast Server and Broadcast Client Toolkit have provided an introduction to the elements and functions of the inventive system. Further details regarding the operation of the elements and implementation of certain of the functions will be provided with reference to the indicated figures.

Figure 4:
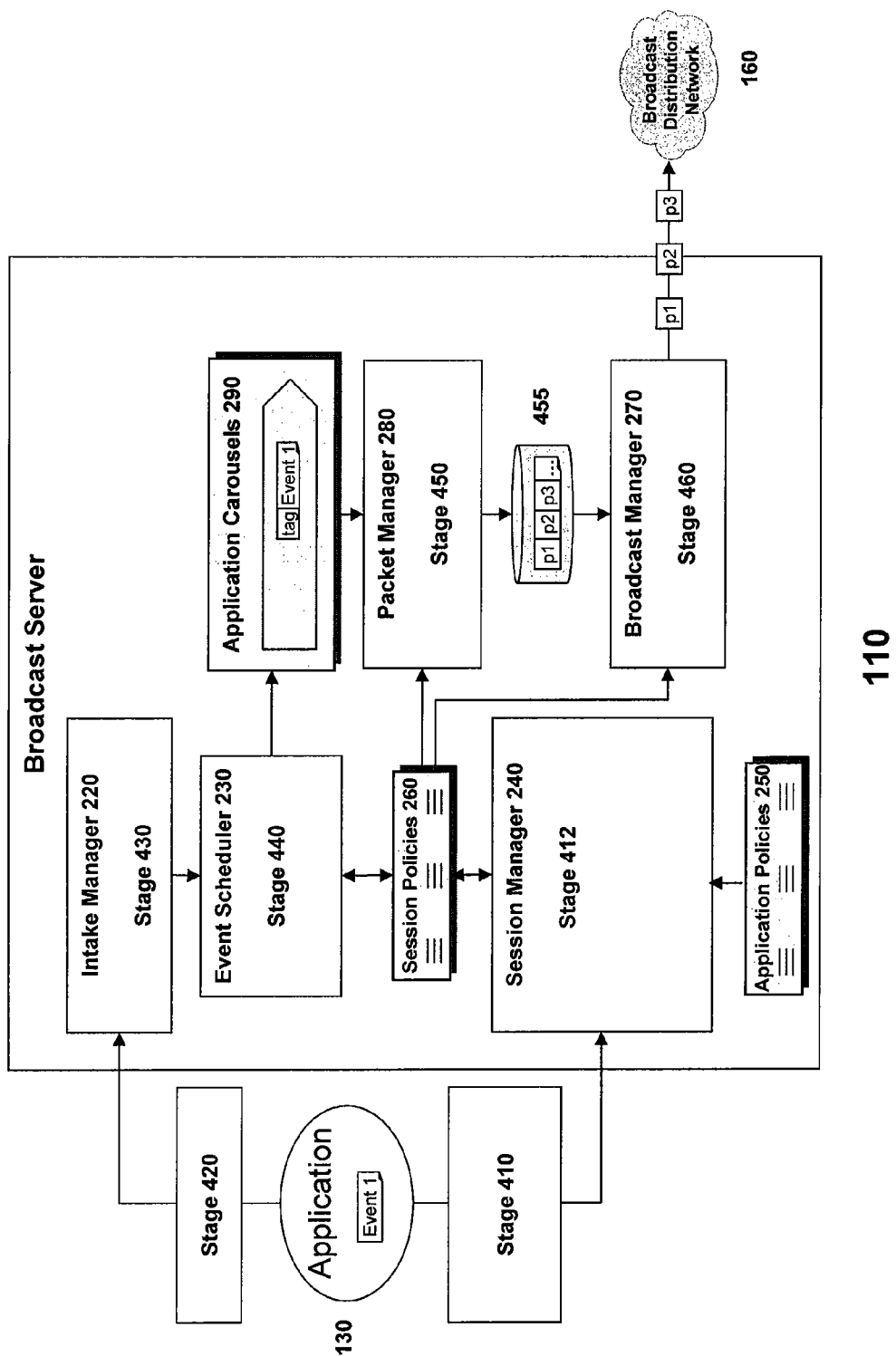
FIG. 4 is a diagram illustrating the typical flow of an event through the Broadcast Server element.
Figure 5:
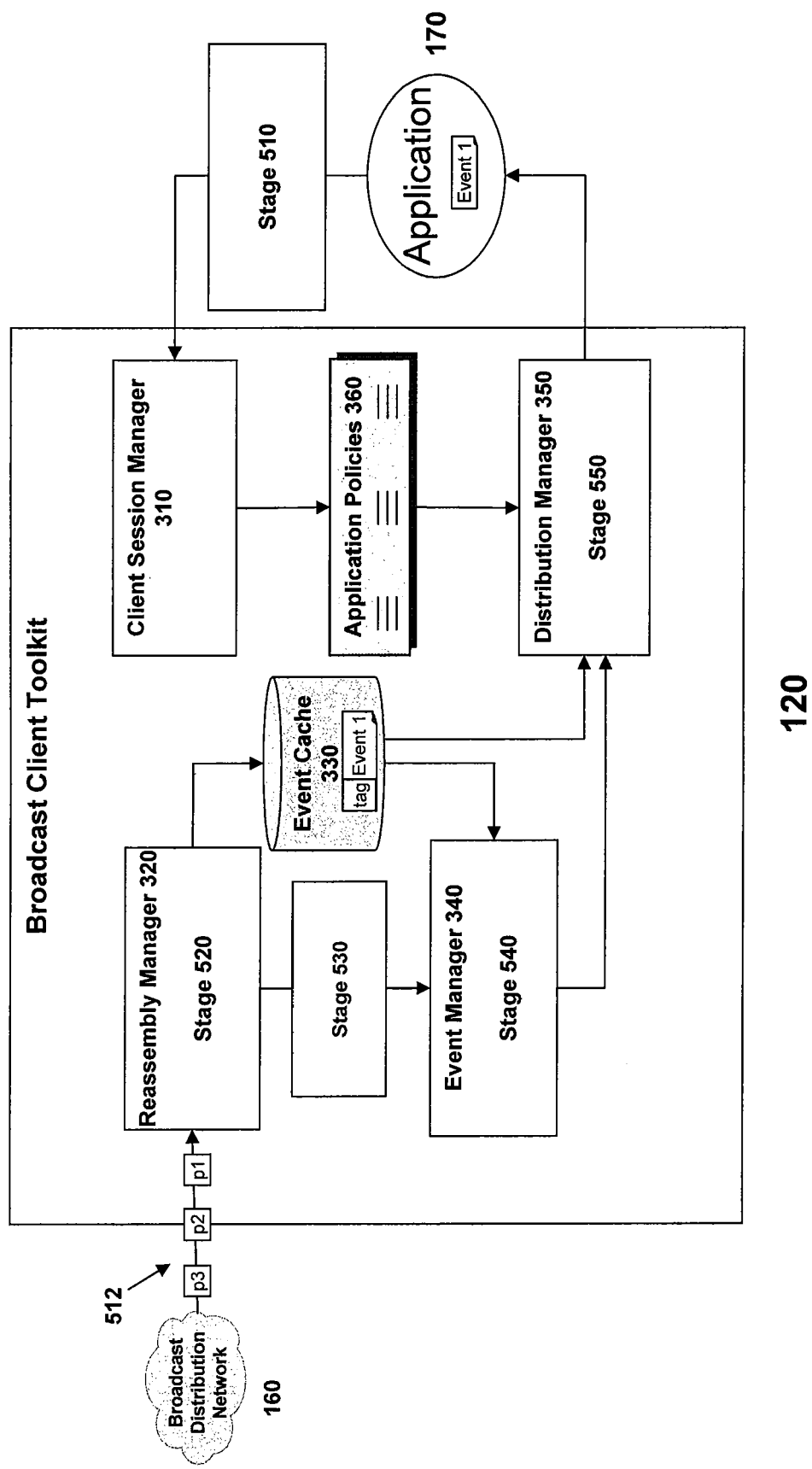
FIG. 5 is a diagram illustrating the typical flow of an event though the Broadcast Client Toolkit element.

FIG. 4 is a diagram illustrating the typical flow of an event through the Broadcast Server element. Similarly, FIG. 5 is a diagram illustrating the typical flow of an event though the Broadcast Client Toolkit element. The following discussion relates to the processes and data flow for an event between Broadcast Server 110 and Broadcast Client Toolkit 120, and references elements in both FIG. 4 and FIG. 5.

In a typical example, the following stages or processes are involved (although it is not required that all occur in each case or that they occur in the precise order indicated):

1. A server-side application 130 opens an event session with Broadcast Server 110 Session Manager 240 (stage 410). In doing so, application 130 may specify the quality of service (QoS) level desired during its operation. Session Manager 240 validates QoS requirements to make sure they can be met (if applicable), creates the event carousel and initial session policy, and allocates bandwidth for the new session, adjusting bandwidth allocated to other sessions if needed (stage 412);
2. A client-side application 170 registers with Broadcast Client Toolkit 120 Session Manager 310 and indicates that it wants to receive events from server-side application 130 (stage 510);
3. Server-side application 130 publishes an event/data with Broadcast Server 110 Intake Manager 220 (stage 420);
4. Intake Manager 220 tags the event/data with a sequence number (if desired) and passes the event to Event Scheduler 230 (stage 430);
5. Event Scheduler 230 places the event/data on the application's carousel 290, and may modify that and/or other applications' bandwidth allocations based on the priority of the event/data and other events already scheduled to be broadcast (stage 440);
6. Packet Manager 280 breaks up the event/data into packets 455 that fit on broadcast network 160, and adds FEC if so specified in the session policy 260 (stage 450);
7. Broadcast Manager 270 uses the session policies 260 to determine when to broadcast the event's packets over network 160 (stage 460);
8. Broadcast Client Toolkit Reassembly Manager 320 receives packets 512 from broadcast network 160, re-assembles the event using FEC if present, and stores the partially received event in Event Cache 330 (stage 520);
9. Once all packets for the event are received, Reassembly Manager 320 notifies Event Manager 340 (stage 530);

10. Event Manager 340 inspects the event's sequence number tag to determine if it can be delivered to an application registered to receive server-side application 130 events (stage 540);

11. If in-order event sequencing is relevant and client-side application 170 has received all prior events, then Event Manager 340 notifies Distribution Manager 350 that the event can be delivered to client-side application 170;

12. Distribution Manager 350 removes the event tags and delivers the event to client-side application 170 (and to other applications registered to receive those events) (stage 550); and 13. Once client-side application 170 (and all others registered to receive that event) has finished with the event, Event Manager 340 removes event from Event Cache 330, thus ending the event's lifespan.

Note that application requirements can include the desired latency, reliability, compression, and linger time for the events, among other aspects. The application may specify these parameters explicitly, or in general terms, such as indicating that it wants a particular type of data delivery mode, such as an event stream, a notification service, or a data object carousel. An event stream service allows an application to send a continual stream of events to a large number of clients. Typical event stream applications include stock ticker and sports scores. In such cases, applications can specify how many events remain on the broadcast carousel and/or the desired latency for new events. Note that depending on the type of events being broadcast, it may not be important to rebroadcast events many times. In that case, event(s) can be distributed more quickly since the carousel will remain relatively small. For other applications, it may be important to ensure that a large number of events are always available to the clients, even if that means it takes longer to broadcast new events. In such cases, the carousel would contain more items, causing a particular event's latency to be greater. The quality of service parameters that are typically important to an event stream service include average event size and frequency, and the desired event latency and linger time.

Another mode of data delivery is that of a notification service, which allows an application to occasionally send a rich notification (for example, the notification could include a video clip) to a large number of clients. The average bandwidth usage of this event stream will be small, but in order to deliver a notification in a timely manner it may be important to preempt other applications. Examples of applications that may utilize such a service include emergency notification, breaking news, and weather alerts. The quality of service parameters that are typically important to a notification service are maximum notification size, the desired latency, and the maximum latency for delivering the notification.

A third mode of data delivery is that of a data object delivery service, which allows an application to add and remove data objects from a carousel for "background" reception by the clients. These objects may be stored as files on the client device or used directly by the receiving application. Examples of applications that may utilize such a service include highlight clips for a sports application. The quality of service parameters that are typically important to data object delivery services include the average object size, the average number of objects to be contained on the carousel, and the desired object latency.

Note that each application may request or be associated with a number of data cast sessions. The bandwidth allocated to an application session can change based on several factors, including:

the QoS requested by the application for that session;
the priority of the session;
the current level of activity of the session;
the activity of other sessions defined by the application;
the activity of the sessions of other applications in the same group; or
operator policies.

As mentioned, when a new application session is set up, it may affect the bandwidth allocated to other applications' sessions. To address this possibility, applications can provide a callback function when setting up a session so that changes in the session's allocated bandwidth can be communicated back to the application. The application can then choose to alter its behavior based on such notifications. Alternatively, the application may set up a policy which Broadcast Server 110 follows when the allocated bandwidth for the session changes.

Application policies 250 specify which applications are allowed to use the broadcast network and how they are allowed to use it. This includes defining the total bandwidth available for a group of applications. Additionally, any limitations concerning the bandwidth allocated to a particular application may be defined by these polices. Application policies 250 may specify different priorities, bandwidth ranges, or allocations based on time of day, or on what other applications are currently active, for example.

As an example, consider the following scenario for applications defined at three different relative priority levels. In the example, the aggregate bandwidth for the entire system is 100 Kb/second. No maximum allowable bandwidths are defined, meaning that they all default to the value of 100 Kb/second.

| | | Bandwidths | |
|---|---|---|---|
| Application | Priority | Guaranteed | Expected |
| Headline News | Low | 2 Kb/s | 10 Kb/s |
| Weather | Low | 2 Kb/s | 20 Kb/s |
| Stock Ticker | Medium | 3 Kb/s | 20 Kb/s |
| Baseball Play-by-play | Medium | 3 Kb/s | 30 Kb/s |
| Homeland Security Alerts | High | 50 Kb/s | 50 Kb/s |
| Traffic Alerts | High | 40 Kb/s | 40 Kb/s |

Note that an important function of the Policy Manager 210 is to ensure that application policies defined by the operator or any other entity coexist without having the potential to cause a situation where any one of the application bandwidth policies can not be honored. Two such constraints that ensure this coexistence, covered in more detail later, include:

The sum of the minimum guaranteed bandwidths for all applications defined to be in the system (group) can not exceed the aggregate bandwidth available to the system (group); and The sum of the expected bandwidths for all applications at a particular priority level plus the sum of the guaranteed minimum bandwidths for all applications with a lower priority can not exceed the aggregate bandwidth available to the system (group).

For the example application bandwidth policies defined above, both constraints are adhered to. First, the sum of the minimum guaranteed bandwidths, 100 Kb/s, does not exceed the aggregate bandwidth defined for the system (also 100

Kb/s). Second, the sum of the expected bandwidths at one priority level plus the sum of the guaranteed bandwidths at all lower priority levels does not exceed the aggregate bandwidth. Examining the lowest priority items, the sum of expected bandwidths, 30 Kb/s, is well below the aggregate bandwidth. Examining the medium priority items, the sum of the expected bandwidths, 50 Kb/s, plus the sum of the lowest priority guaranteed minimum bandwidths, 4 Kb/s, remains below the aggregate bandwidth of 100 Kb/s. Lastly, the sum of the highest priority expected bandwidths, 90 Kb/s, plus the sum of low and medium priority bandwidths, 10 Kb/s, does not exceed the 100 Kb/s aggregate bandwidth.

The network operator could increase the expected bandwidths of the medium priority applications. However, the sum of those bandwidths could be at most 100 Kb/s minus the sum of the guaranteed minimum bandwidths of the low priority applications, 4 Kb/s, or 96 Kb/s. This is because an allocation greater than that would create an inconsistency in the policies.

Note that application policies can be more complex than the previous example. For example, time of day may be a factor. In this regard, a stock ticker application may need more bandwidth during trading hours. A baseball play-by-play application may only need bandwidth when baseball games are being played. A traffic alert application may not get as much high priority bandwidth outside of rush hour. In these cases, the application bandwidth constraints would need to be checked for each time period under which each application policy remains in effect.

In addition to application level policies, the inventive system may also implement session level policies. Session policies refer to the policies in effect for each application session, as noted by Session Policies 260. Such a policy may contain the various bandwidth limits as set by the operator, the currently allocated bandwidth assigned to the carousel, the application's session parameters for options such as in-order deliver, compression, and FEC, and any QoS policies the application has set up to have Broadcast Server 110 automatically deal with changes in allocated bandwidth. Such QoS policies may be needed because the allocated bandwidth can change frequently, depending on changes in network traffic conditions. Those changes in turn could affect the QoS experienced by the application session such that the application may want to specify an automated action to take to respond to the decrease (or increase) in allocated bandwidth.

Event Scheduler 230 manages the carousel policies, which in turn determines the order in which events are broadcast over the network. The bandwidth allocated to each application is dynamic and can change with each event added to the system. If an application is not using all the bandwidth allocated to it, then Event Scheduler 230 may allocate the unused bandwidth to other applications. Event Scheduler 230 uses application policies and current traffic patterns of how network bandwidth is being used to optimally allocate bandwidth for the entire system. In this sense, Event Scheduler 230 operates to dynamically determine the priority of each carousel or set of events to be broadcast over the network. It functions to place (i.e., order or initially place) or remove events from each carousel based on the system requirements and priority of events. It also operates to update session policies based on current traffic patterns.

In general, applications can use up to what is termed their "expected bandwidth". However, applications may be allocated more than their expected bandwidth if other applications sharing the same broadcast resource are idle or not fully utilizing their allocated bandwidths. Using the example of a shared 100 Kb/s resource, suppose that the high priority applications are idle:

| Application | Priority | Bandwidths | |
|---|---|---|---|
| | | Guaranteed | Expected |
| Headline News | Low | 2 Kb/s | 10 Kb/s |
| Weather | Low | 2 Kb/s | 20 Kb/s |
| Stock Ticker | Medium | 3 Kb/s | 20 Kb/s |
| Baseball Play-by-play | Medium | 3 Kb/s | 30 Kb/s |
| Homeland Security Alerts (idle) | High | 50 Kb/s | 50 Kb/s |
| Traffic Alerts (idle) | High | 40 Kb/s | 40 Kb/s |

Even if all medium and low priority applications have events to broadcast and use their expected bandwidths, only 80 Kb/s of the 100 Kb/s will be used. The extra bandwidth can then be allocated in a variety of ways. For example, extra bandwidth could be allocated equally to the active applications. Assuming that applications will use all the bandwidth made available to them, the extra 20 Kb/s would be equally divided between the 4 applications such that each application gets an additional 5 Kb/s:

| Application | Bandwidths | |
|---|---|---|
| | Expected | Allocated |
| Headline News | 10 Kb/s | 15 Kb/s |
| Weather | 20 Kb/s | 25 Kb/s |
| Stock Ticker | 20 Kb/s | 25 Kb/s |
| Baseball Play-by-play | 30 Kb/s | 35 Kb/s |

Another way to allocate the extra bandwidth would be to give each application an amount proportional to the expected bandwidths defined for those applications. For example, an application with twice the expected bandwidth relative to another application will get twice the extra bandwidth made available to that other application. Using this methodology for the example, the sum of the expected bandwidths is 80 Kb/s and the extra bandwidth is 20 Kb/s, meaning each application would be allocated bandwidth using the following formula:

Allocated=Expected+(Expected*20/80), which would result in the following allocation:

| Application | Bandwidths | |
|---|---|---|
| | Expected | Allocated |
| Headline News | 10 Kb/s | 12.5 Kb/s |
| Weather | 20 Kb/s | 25 Kb/s |
| Stock Ticker | 20 Kb/s | 25 Kb/s |
| Baseball Play-by-play | 30 Kb/s | 37.5 Kb/s |

Some applications may have no need for bandwidth above their minimum levels, or the operator may impose a maximum bandwidth that an application can use. In that case, the application in question may not be allocated any additional bandwidth, or only a smaller amount of the bandwidth that would otherwise have been allocated to it. The remainder may then be divided up between the remaining applications.

Now consider the previous example where the low and medium priority applications are using their allocated bandwidths. If the high priority traffic alert application sends an event to be broadcast, it will be allocated 40 Kb/s. The remaining 60 Kb/s will be allocated to the medium and low priority applications. The medium priority applications will still have access to their respective expected bandwidths; a total of 50 Kb/s, since doing so will not exceed the aggregate bandwidth of 100 Kb/s. The remaining 10 Kb/s will then be allocated to the low priority applications. They will not have access to their respective expected bandwidths, which total 30 Kb/s. If the network operator has specified that the bandwidth for applications at the same priority are allocated in proportion to the expected bandwidths, then the weather application will get ⅔ of the 10 Kb/s and the headline news application will get ⅓ of the 10 Kb/s. This will result in the following bandwidth allocations:

|             | Bandwidths | |
| Application | Expected | Allocated |
| --- | --- | --- |
| Headline News | 10 Kb/s | 3.3 Kb/s |
| Weather | 20 Kb/s | 6.7 Kb/s |
| Stock Ticker | 20 Kb/s | 20 Kb/s |
| Baseball Play-by-play | 30 Kb/s | 30 Kb/s |
| Traffic Alert | 40 Kb/s | 40 Kb/s |

Further consider the case where instead of the traffic alert application sending an event, the homeland security application sends an event. It will be allocated 50 Kb/s. The remaining 50 Kb/s will be allocated to the medium and low priority applications. If the medium priority applications received access to their respective expected bandwidths (a total of 50 Kb/s), then there would be nothing left for the low priority applications. Since the low priority applications are guaranteed a minimum of 2 Kb/s each, they must get a combined total of no less than 4 Kb/s. If each is given it's guaranteed minimum of 2 Kb/s each, the remaining 46 Kb/s can then be allocated to the medium priority applications. If the network operator has specified that bandwidth for applications at the same priority are allocated in proportion to the expected bandwidths, then the stock ticker application will get ⅖ of the 46 Kb/s and the baseball play-by-play application will get ⅗ of the 46 Kb/s. This will result in the following bandwidth allocations:

|             | Bandwidths | |
| Application | Expected | Allocated |
| --- | --- | --- |
| Headline News | 10 Kb/s | 2 Kb/s |
| Weather | 20 Kb/s | 2 Kb/s |
| Stock Ticker | 20 Kb/s | 18.4 Kb/s |
| Baseball Play-by-play | 30 Kb/s | 27.6 Kb/s |
| Traffic Alert | 50 Kb/s | 50 Kb/s |

Note that when a higher priority event causes a reduction in the bandwidth allocated to other applications, Event Scheduler 230 has enough information to determine when the broadcast of that event will be complete. The broadcast time of the event will depend on the event's size and the bandwidth allocated to that event's application session. Since the event can not be preempted, the bandwidth allocated should remain in effect for the duration of the broadcast of that event. Event Scheduler 230 can use knowledge of the high priority event's broadcast duration to affect how it degrades the quality of service (QoS) provided to other applications, or make that information available to other applications so that they can make decisions based on their own strategies for dealing with a decrease in allocated bandwidth. Note that in such a case, any such prediction as to re-allocation of bandwidth is just that. If another high priority event arrives before the first one completes broadcast, the original prediction will be inaccurate. However, as high priority events are expected to occur infrequently, the prediction may often be reliable or only occasionally incorrect.

Session Policies

As noted with reference to the discussion of Session Manager 240 and Session Policies 260, the inventive system is also capable of implementing policies at a session level, in addition to those implemented at an application level. Session policies refer to the policies in effect for each application session. The session policy may contain various bandwidth limits as set by the operator, the currently allocated bandwidth assigned to the carousel, the application's session parameters for options such as in-order deliver, compression, or FEC, and policies the application has defined or requested to enable the Broadcast Server to automatically deal with changes in quality of service. A session's allocated bandwidth is used by the Broadcast Manager to determine the rate at which to pull packets from each application's carousel. Breaking up of the events into packets for broadcast over the network for each carousel is performed by the Packet Manager.

A single application may request and participate in setting up multiple broadcast sessions. This gives an application the ability to send different types of events that are broadcast with different priorities. Broadcast server 110 handles the prioritization for the application. The application specifies the session's priority with the restriction that it can not give any session a priority higher than what was defined for the application in the application policy. As an example, consider a stock ticker application with the indicated application policy as defined by the network operator:

|             |          | Bandwidths | |
| Application | Priority | Guaranteed | Expected |
| --- | --- | --- | --- |
| Stock Ticker | Medium | 3 Kb/s | 20 Kb/s |

The stock ticker application may desire to have two broadcast sessions, one for real-time stock quotes, and one for historical quotes. The stock ticker might request two sessions with the following characteristics:

|         |          | Bandwidth Requests | |
| Session | Priority | Guaranteed | Expected |
| --- | --- | --- | --- |
| Historical quotes | Low | 1 Kb/s | 5 Kb/s |
| Real-time quotes | Medium | 2 Kb/s | 19 Kb/s |

Note that an important function of the Session Manager 240 is to ensure that sessions defined by an application adhere to the application policy defined by the operator. This includes not only preventing an application from defining sessions with a higher priority than the application was granted, but includes policies concerning bandwidth requests in relation to the constraints specified in the application policy. Two such policies, covered in more detail later, include:

The sum of the minimum guaranteed bandwidths for all sessions can not exceed the minimum guaranteed bandwidth defined in the application policy; and The sum of the expected bandwidths for all sessions at a particular priority level plus the sum of the minimum guaranteed bandwidths for all sessions with a lower priority can not exceed the expected bandwidth defined in the application policy.

Note that based on the requests given in the example above, these session bandwidth constraints are met. The sum of the minimum guaranteed bandwidths is equal to or less than the application's minimum guaranteed bandwidth. Also, the sum of the medium priority session's expected bandwidth plus the low priority session's guaranteed minimum bandwidth does not exceed the application's expected bandwidth. If the application attempted to increase the medium priority session's expected bandwidth to 20 Kb/s, that constraint would be broken. If the application wants to enable support of such a change, then it could reduce the low priority session's guaranteed minimum bandwidth to 0 Kb/s, such that:

|  |  | Bandwidth Requests | |
| --- | --- | --- | --- |
| Session | Priority | Guaranteed | Expected |
| Historical quotes | Low | 0 Kb/s | 5 Kb/s |
| Real-time quotes | Medium | 2 Kb/s | 20 Kb/s |

There may be times when two or more applications of different priority have defined sessions that have the same priority, and those sessions contend for the same bandwidth resource. Under such circumstances, the respective applications' priorities will be used to allocate more bandwidth to one session over another, even though those sessions technically have the same priority. This is necessary to enforce the expected bandwidth policy. As an example, consider the following:

|  |  | Bandwidths | |
| --- | --- | --- | --- |
| Application | Priority | Guaranteed | Expected |
| Headline News | Low | 2 Kb/s | 10 Kb/s |
| Stock Ticker | Medium | 3 Kb/s | 20 Kb/s |

Assume that the following three sessions are set up, one for a headline news application and two for a stock ticker application:

|  |  | Bandwidth Requests | |
| --- | --- | --- | --- |
| Session | Priority | Guaranteed | Expected |
| Headline News | Low | 2 Kb/s | 10 Kb/s |
| Stock ticker: Historical quotes | Low | 1 Kb/s | 5 Kb/s |
| Stock ticker: Real-time quotes | Medium | 2 Kb/s | 18 Kb/s |

If, during the bandwidth allocation, the medium priority session gets its expected bandwidth of 18 Kb/s and there remains 8 Kb/s to be allocated, then the stock ticker low priority session will be given its full expected amount and the headline news session will receive the remainder:

|  | Bandwidths | |
| --- | --- | --- |
| Session | Expected | Allocated |
| Headline News | 10 Kb/s | 3 Kb/s |
| Stick ticker: Historical quotes | 5 Kb/s | 5 Kb/s |
| Stock ticker: Real-time quotes | 18 Kb/s | 18 Kb/s |

The bandwidth allocation works out this way because even though the stock ticker low priority session has the same priority as the headline news session, its parent application's priority is higher than the headline news' priority. In effect, it is preempting the headline news session.

An application may request that events move between sessions. For example, a high priority event may need to be rebroadcast frequently for a short period of time, then can be demoted to lower priority for slower repetition afterwards. Event Scheduler 230 also handles the implementation of these requests.

Bandwidth and Network Resource Allocation

As is evident from the preceding discussions, bandwidth management (e.g., allocation and reallocation) is one of the most important functions provided by Broadcast Server 110. It is because of this management function that multiple applications are able to share the same broadcast resource in an efficient manner. In this sense, one goal of bandwidth management is to provide the best quality of service to all applications using the shared broadcast resource.

A network operator typically allocates, or is provided, a portion of the broadcast media that is available for its use. This is referred to as the aggregate bandwidth, since the sum of all application's bandwidth usage at any moment in time can not exceed this amount. Broadcast Server 110 functions to ensure that it never transmits events over the broadcast network 160 in such a way that it exceeds the aggregate bandwidth allocated to it, where the network operator uses Policy Manager 210 to define this value.

A network operator may define groups of applications, where each group is given a data channel, which is a portion of the bandwidth resource that was made available to the network operator. Each application group will typically be assigned its own defined aggregate bandwidth, and the sum of the aggregate bandwidths for all groups can not exceed the total resource available. In such cases any bandwidth rules or constraints would typically be applied to each group individually. One benefit of defining groups is that it permits the network operator to separate certain applications from others and apply a set of rules to groups for which those rules may be most applicable. This gives the network operator more control over how applications affect one another when sharing the same bandwidth resource. However, note that defining groups can cause lower efficiency in terms of sharing the total bandwidth resource available to the network operator. This is because one group typically can not utilize the unused bandwidth of another group.

The bandwidth allocated to an application is dynamic and can change based on the activity of other applications. However, most classes of applications have a fairly constant bandwidth requirement. They may be able to take advantage of additional bandwidth when it is available, but under normal circumstances, their bandwidth consumption is relatively fixed at a predicable level.

However, there are classes of applications which have less predictable bandwidth requirements. One example is alert notification services. Alerts occur at unpredictable times and typically are given higher priority over other applications.

Most of the time, alert notification services are idle and not using significant bandwidth resources. In such cases, it would not be an efficient use of the broadcast resource to dedicate bandwidth to such an application since that bandwidth would frequently remain unused. However, when an alert does occur, that event preempts activity by other, lower priority applications. During such times, the bandwidth available to the other applications may be significantly reduced. That reduction may cause the quality of service of those applications to degrade below acceptable or desired levels. In such circumstances, applications will not be starved of bandwidth and instead will be provided an opportunity to react to such changes. Note that these reductions are typically limited in duration since once the alert notification has been broadcast, the bandwidth can be restored to the other applications in the system.

Due to the nature of the various types of applications, the present invention permits the definition of several bandwidth thresholds, constraints, values or relationships for each application. Policy Manager 210 allows network operators to specify these thresholds or values, and they can be altered if desired. As will be described in greater detail, Broadcast Server 100 functions to enforce these thresholds or values in accordance with certain specified rules or relationships and also informs applications when the thresholds or values change.

The first threshold, constraint, value, etc. is termed the guaranteed minimum bandwidth available to an application. This is defined as the allocated bandwidth such that no matter what other higher priority traffic exists in the system, an application will be given no less than the guaranteed minimum bandwidth for its own use. Note that this threshold amount may be too low for the application to provide a desired level of quality of service, but applications can expect that they will not need to operate at this level for extended periods of time. The network operator should allocate bandwidth so that the guaranteed minimum bandwidths are defined in such a way that the sum for all applications that can be running simultaneously do not exceed the aggregate bandwidth. This is because doing so could cause the Broadcast Server to violate the minimum bandwidth guarantee for one or more applications. To prevent this, Policy Manager 210 will enforce this constraint and not allow policies to be defined that may cause such violations.

A second bandwidth threshold is termed the expected bandwidth. This is the bandwidth guaranteed to an application as long as no higher priority application requires use of that bandwidth. If all applications running in the system have the same priority, the expected bandwidth will always be available to the application. Applications may be given or offered more bandwidth than the expected bandwidth depending on other traffic in the system, but applications may need to operate at this level for an ongoing basis. Applications are not allowed to start a session that requires more bandwidth than the expected bandwidth since this is the base level of bandwidth that an application can count on under normal operating conditions.

Note that the sum of the expected bandwidths for a particular priority level plus the sum of the guaranteed minimum bandwidths for all lower priority applications can not exceed the aggregate bandwidth. Doing otherwise could cause a situation where the Broadcast Server is unable to honor the minimum guaranteed bandwidth for the lower priority applications, or be unable to honor the expected bandwidths for the higher priority applications. Again, Policy Manager 210 will not allow the network operator to apply a policy or set of policies where this situation occurs.

Note that for applications defined at the highest priority, the expected bandwidths must be equal to the guaranteed minimum bandwidths. This is due to the fact that there are no applications that can preempt them, since they are at the highest priority level.

Another bandwidth threshold that may be used is termed the maximum allowable bandwidth. This is an optional limit that the network operator can place on any application in order to prevent it from exceeding a certain level of bandwidth usage. In such situations, even if more bandwidth is available, the application is not allowed to use it. If the operator chooses not to set a maximum allowable bandwidth for an application, the default value is the aggregate bandwidth.

Note that in terms of the bandwidth thresholds or values described previously, certain relationships may be derived that characterize the operation of the bandwidth allocation methods and processes. In the following, the total bandwidth available to an application group is provided by the broadcast network operator and used by the operator when configuring applications on the Broadcast Server. In terms of bandwidth allocated to a group of one or more applications, one may define:

$\overline{B}$: Total bandwidth of data channel assigned to application or group of applications.

Note that the total bandwidth usage at any instant by all sessions of all applications in the group cannot exceed $\overline{B}$.

Specified by the network operator on a per-application basis, define the following symbols based on the bandwidth thresholds above:

A: Set of apps in the group;
$\overline{M}_a$: Guaranteed minimum bandwidth available to application a;
$\overline{E}_a$: Expected bandwidth available to application a;
$\overline{X}_a$: Maximum allowable bandwidth available to application a;
P: Set of priority levels; and
$\overline{P}_a$: Max priority of any session in application a.

Note that the following relationship holds:

$$\forall a \in A: 0 \leq \overline{M}_a \leq \overline{E}_a \leq \overline{X}_a \leq \overline{B}$$

In terms of a constraint that follows from these definitions and relationships, note that for each priority level, it must be possible for applications to operate at their expected bandwidth when they are not preempted, even if they have to preempt lower priority apps to do so. That is, it must be possible to run all the apps with a given priority value (assuming all their expected bandwidth is used at that priority), plus run all lower priority apps at their guaranteed minimum bandwidths:

$$\forall p \in P: \sum_{\substack{a \in A \\ \overline{p}_a = p}} \overline{E}_a + \sum_{\substack{a \in A \\ \overline{p}_a < p}} \overline{M}_a \leq \overline{B}$$

Session Bandwidth Constraints

In addition to the bandwidth constraints described with reference to a group of applications, there are bandwidth constraints and relationships that apply to the broadcast sessions. In a typical example, an application will provide session parameters that include a desired level of quality of service at the time a session is requested; these parameters may then be converted to an effective bandwidth, as described with reference to the discussion of QoS Management.

Define:
S: Set of sessions
$S_a$: Subset of sessions that belong to app $a \in A$ Each session can be assigned the following resource (i.e., bandwidth) parameters, with these parameters given or derived from QoS parameters:

$M_s$: Guaranteed minimum bandwidth of session s;

$E_s$: Expected bandwidth of session s; and $p_s$: Priority of session s.

During operation, an application may create or remove sessions, or modify the parameters of a session. Normally it is expected that an application will create a session and subsequently keep the values of M, E and p fixed because these values reflect long-term average bandwidth usage by the application; however, in theory any of the parameters may be varied over time.

The session priority can't exceed the maximum priority for the application, though it may be lower:

$$\forall a \in A: \forall s \in S_a : p_s \leq \overline{p}_a$$

Further, the guaranteed minimum bandwidths for an application's sessions can't together exceed the guaranteed minimum bandwidth for the application:

$$\forall a \in A : \sum_{s \in S_a} M_s \leq \overline{M}_a$$

The application's sessions should be able to coexist by preempting one another, i.e., for each priority level for which a session exists, it should be possible to run all the sessions in an application with that priority at their expected bandwidths, plus run all lower priority sessions at their guaranteed bandwidths, all within the expected bandwidth of the application:

$$\forall a \in A: \forall p \in P: \sum_{\substack{s \in S_a \\ p_s = p}} E_s + \sum_{\substack{s \in S_a \\ p_s < p}} M_s \leq \overline{E}_a$$

Dynamic Bandwidth Requests By Applications

Note that to accommodate fluctuations in application usage of bandwidth, an application may specify a currently requested bandwidth value, either in the form of a set of QoS parameters, or as a factor relative to the expected average $E_s$:

$D_s$: Bandwidth currently requested by session s (default: $E_s$).

An application may also specify that it can make use of even more bandwidth if available:

$X_s$: Maximum bandwidth requested by session s (default: $D_s$)

These values may be used to influence the allocation of excess bandwidth to sessions. Note that an application is not guaranteed to get the bandwidth it requests, even under normal operating conditions, if this exceeds $E_s$. Moreover, the application may actually request less than $E_s$, temporarily giving up bandwidth to other applications. For example, a notification session does this implicitly when no notification is active.

When a session update is made to reallocate excess bandwidth across sessions, each session s in the system is allocated a nominal bandwidth $b_s$. Any suitable algorithm or heuristic may be used to perform this (re)allocation, subject to the following conditions:

1. The sum of the bandwidth allocated to all application sessions can not exceed the total data channel bandwidth defined:

$$\sum_{s \in S} b_s \leq \overline{B}$$

Note that it is possible that a session has requested less than its minimum bandwidth(s), so define:

$E'_s = \min(E_s, D_s)$: Dynamic expected bandwidth of session s; and $M'_s = \min(M_s, D_s)$: Dynamic guaranteed bandwidth of session s.

2. The allocated bandwidth must be in the range:

$$\forall s \in S: M'_s \leq b_s \leq X_s$$

3. Further, a session should get at least its desired bandwidth; if not, then it should be the case that every higher priority session got no more than it asked for:

$$\forall s \in S: b_s < D_s \Rightarrow \forall t \in S | p_t > p_s : b_t \leq D_t$$

4. Similarly, a session should get at least its dynamic expected bandwidth; if not, then it should be true that every higher priority session got no more than its effective expected bandwidth:

$$\forall s \in S: b_s < E'_s \Rightarrow \forall t \in S | p_t > p_s : b_t \leq E'_t$$

5. Finally, a session should get at least its dynamic expected bandwidth if nothing with higher priority has requested bandwidth:

$$\forall s \in S: \sum_{\substack{t \in S \\ p_t > p_s}} D_s = 0 \Rightarrow b_s \geq E'_s$$

Note that if the application bandwidth provisioning process satisfied the relevant constraints, it will generally be possible to satisfy this last condition.

Within these constraints, the system may allocate resources in accordance with any applicable algorithm, rule set, or heuristic, using the requested, maximum and guaranteed bandwidths as guides that affect how excess bandwidth is distributed among the sessions. As will be discussed in greater detail, bandwidth allocation is managed by Event Scheduler 230. Event Scheduler 230 uses the application policies set up by the operator, the application's current requirements, and the bandwidth usage by other applications in the system to determine the allocated bandwidth.

Note that changes in an application's allocated bandwidth should be communicated to the application so that it has the opportunity to react to those changes. Applications can react to bandwidth changes in real-time, or can set up policies beforehand that the Broadcast Server implements when bandwidth changes occur.

Bandwidth Allocation—Overview

The methods and processes utilized by the present invention to allocate bandwidth among multiple applications will be now be described in further detail. The processes involved in bandwidth allocation can be summarized as follows, although not all stages in the described process may occur for each application or session:

The network operator assigns broadcast bandwidth to an application or group of applications;

If applicable, the operator specifies constraints on the bandwidth usage of each application in the group. These allocations must be consistent with the overall group bandwidth allocation;

Each application in the group may dynamically add or remove one or more sessions, specifying overall QoS parameters and priority for each session;

Once a session is set up, an application may temporarily request more (or less) bandwidth for that session than the longer term requirements;

Nominal bandwidth is allocated on a per-session basis each time there is a session parameter change, based on the currently requested QoS. This may involve changing the bandwidth allocated to other sessions, and notifying the affected applications of the changes; and Bandwidth may be internally redistributed by the Broadcast Server without notification to an affected application, and notwithstanding the nominal allocations, based on the instantaneous resource usage within the sessions. However, the nominal bandwidth is available to a session if it begins to use resources.

Bandwidth Allocation—Further Details

The following is an example of a possible bandwidth allocation process, algorithm, rule set, or heuristic that may be used by the Session Manager to allocate bandwidth to a session, based on the existing sessions and relevant application level constraints, and in accordance with the definitions and constraints previously described:

1. Determine the expected bandwidth requirement based on the quality of service parameters specified by the application;
2. Based on the expected bandwidth required, other sessions that this application may have open, and the application policy as set by the operator, determine if the new request would cause the session constraints for the application to be violated (in accordance with the Session Bandwidth Constraints discussed previously):
   a. Sum the expected bandwidths for all sessions with the same priority as the new request, the expected bandwidth requested by the new session, and all guaranteed minimum bandwidths for all sessions with a priority lower than the new request;
   b. If the sum above is greater than the expected bandwidth as set by the operator in the application's policy, deny the request and:
      i. compute the expected bandwidth that could be allocated as the difference between expected bandwidth defined in the application's policy and the sum computed above, minus this new request;
      ii. based on the bandwidth computed above, compute an expected quality of service that could be given relative to the original quality of service requested and return that value to the application;
3. If the expected bandwidth is allowed by the application policy, compute the minimum guaranteed bandwidth requested by the application based on the relative quality of service supplied with the request and determine if the new request would cause the session level bandwidth constraints for the application to be violated (in accordance with the Session Bandwidth Constraints discussed previously);
   a. Sum the minimum guaranteed bandwidths defined for any other sessions the application has already opened, with the new request and:
      i. If the sum is greater than the minimum guaranteed bandwidth as defined in the application's policy, deny the request and inform the application of what minimum guaranteed quality of service could be supported by:
         1. Subtracting the sum of the minimum guaranteed bandwidths defined for all sessions the application has already opened from the minimum guaranteed bandwidth defined in the application's policy;
   b. For each priority level above the priority level of the session being created:
      i. Sum the expected bandwidths for all application sessions with the current priority level, the minimum guaranteed bandwidths for all application sessions with a priority lower than the current priority, and the minimum guaranteed bandwidth for the new request and:
         1. If the sum is greater than the expected bandwidth as defined in the application's policy, deny the request and inform the application of what minimum guaranteed quality of service could be supported by:
            a. Subtracting the sum of the expected bandwidths for all application sessions with the current priority level plus the minimum guaranteed bandwidths for all application sessions with a priority lower than the current priority from the expected bandwidth defined in the application's policy.

Given that the new session request does not violate the session bandwidth constraints, the nominal allocated bandwidth can then be computed. This may involve reallocating the bandwidth of other sessions, including sessions of other applications. This procedure or an equivalent one is used when an application dynamically changes its requested bandwidth.

4. If the expected bandwidth can be supported, and the minimum guaranteed bandwidth, if specified, can be supported:
   a. Compute the maximum usable bandwidth as the lowest of:
      i. the maximum allowable bandwidth specific in the application's policy or
      ii. if specified, the maximum usable quality of service converted to bandwidth;
   b. Compute the application's desired bandwidth using:
      i. if supplied, the desired quality of service
      ii. if not supplied, use the expected bandwidth
   c. Compute the bandwidth that can be currently allocated to the session as follows:
      i. if unused bandwidth is readily available, allocate up to the application's maximum usable bandwidth;
      ii. If the bandwidth allocated in the prior step is less than the application's desired bandwidth, compute the additional bandwidth needed and take bandwidth from existing applications using a bandwidth reallocation algorithm subject to the following constraints:
         1. no existing application can be reduced below the lower of its desired or its minimum guaranteed bandwidth;
         2. no application can be reduced below the lower of its desired or expected bandwidth unless all other applications with a priority level equal to or less than the priority level of the application in question are operating at or below the lower of their desired or expected bandwidths;

d. Store the application's desired bandwidth, expected bandwidth, minimum guaranteed bandwidth, and maximum usable bandwidth with the session's policy for use in distributing bandwidth in future calculations;
e. Assign a base quality of service number to the expected bandwidth;
f. Compute quality of service numbers for the minimum guaranteed, currently allocated, and maximum allowable bandwidths relative to the base quality of service number;
g. Allocate the bandwidth initially assigned to this application;
h. Return to the application the expected quality of service number, the minimum guaranteed quality of service number, the maximum quality of service number, and the currently allocated quality of service number.

The following is an example of a bandwidth reallocation algorithm, as required by step 4-c-ii in the bandwidth allocation procedure described above, that redistributes bandwidth across all priority levels. The same algorithm may be used when a new session is created, a session's parameters are changed, or when a session is closed.

1. for the purposes of calculations that follow, if a session's desired bandwidth is less than the session's expected bandwidth, use the session's desired bandwidth in place of the session's expected bandwidth (i.e., $E'_s = \min(E_s, D_s)$);
2. for the purposes of all calculations that follow, if a session's desired bandwidth is less than the session's minimum guaranteed bandwidth, use the session's desired bandwidth in place of the session's minimum guaranteed bandwidth (i.e., $M'_s = \min(M_s, D_s)$);
3. if there is enough bandwidth to give each application session its maximum usable bandwidth, allocate to each application session the maximum usable bandwidth. Finished.
4. if there is enough bandwidth to give each application session its desired bandwidth:
   a. allocate to each application session the desired bandwidth;
   b. if more bandwidth is available, starting at the highest priority session and continuing while more bandwidth is available:
      i. sum the difference between the maximum allowable bandwidth and the desired bandwidth for each application session at this priority level;
      ii. if the sum is less than the remaining bandwidth, allocate the maximum allowable bandwidth to all application sessions at this priority level, and continue with the next lower priority level;
      iii. if the sum is greater than the remaining bandwidth, allocate the remaining bandwidth in an amount proportional to the difference between the maximum usable bandwidth and the desired bandwidth for all application sessions at this priority level. Finished.
5. if there is enough bandwidth to give each application its expected bandwidth:
   a. allocate to each application session the expected bandwidth;
   b. if more bandwidth is available, starting at the highest priority session and continuing while more bandwidth is available:
      i. sum the difference between the desired bandwidth and the expected bandwidth for each application session at this priority level;
      ii. if the sum is less than the remaining bandwidth, allocate the desired bandwidth to all application sessions at this priority level, and continue with the next lower priority level;
      iii. if the sum is greater than the remaining bandwidth, allocate the remaining bandwidth in an amount proportional to the difference between the desired bandwidth and the expected bandwidth for all application sessions at this priority level. Finished.
6. allocate to each application session the guaranteed minimum bandwidth;
7. if more bandwidth is available, starting at the highest priority session and continuing while more bandwidth is available:
   a. sum the difference between the expected bandwidth and the minimum guaranteed bandwidth for each application session at this priority level;
   b. if the sum is less than the remaining bandwidth, allocate the expected bandwidth to all application sessions at this priority level, and continue with the next lower priority level;
   c. if the sum is greater than the remaining bandwidth, allocate the remaining bandwidth in an amount proportional to the difference between the expected bandwidth and the minimum guaranteed bandwidth for all application sessions at this priority level. Finished.

Figure 6:
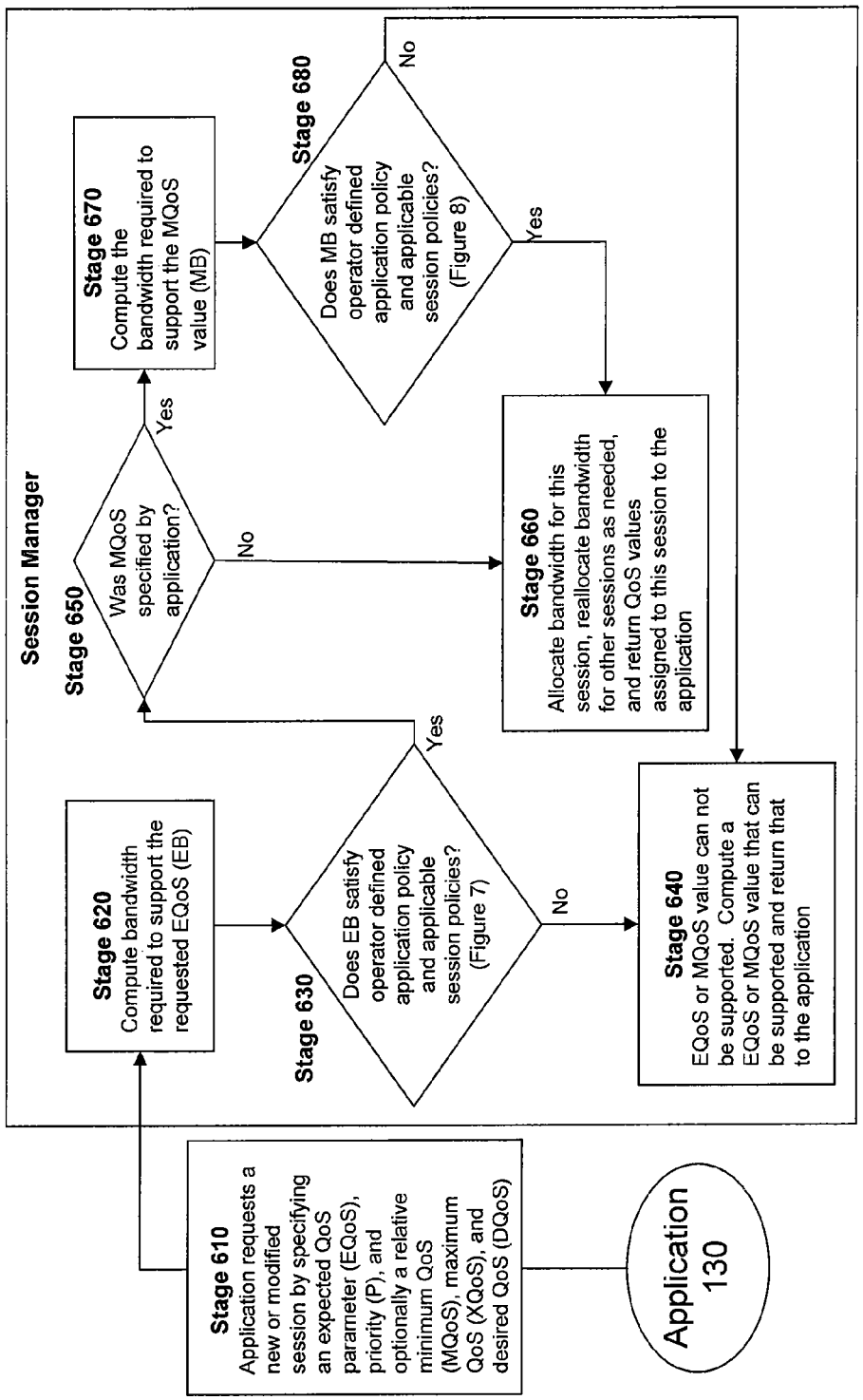
FIG. 6 is a diagram illustrating a process of creating an application session that may be utilized as part of the present invention.
Figure 7:
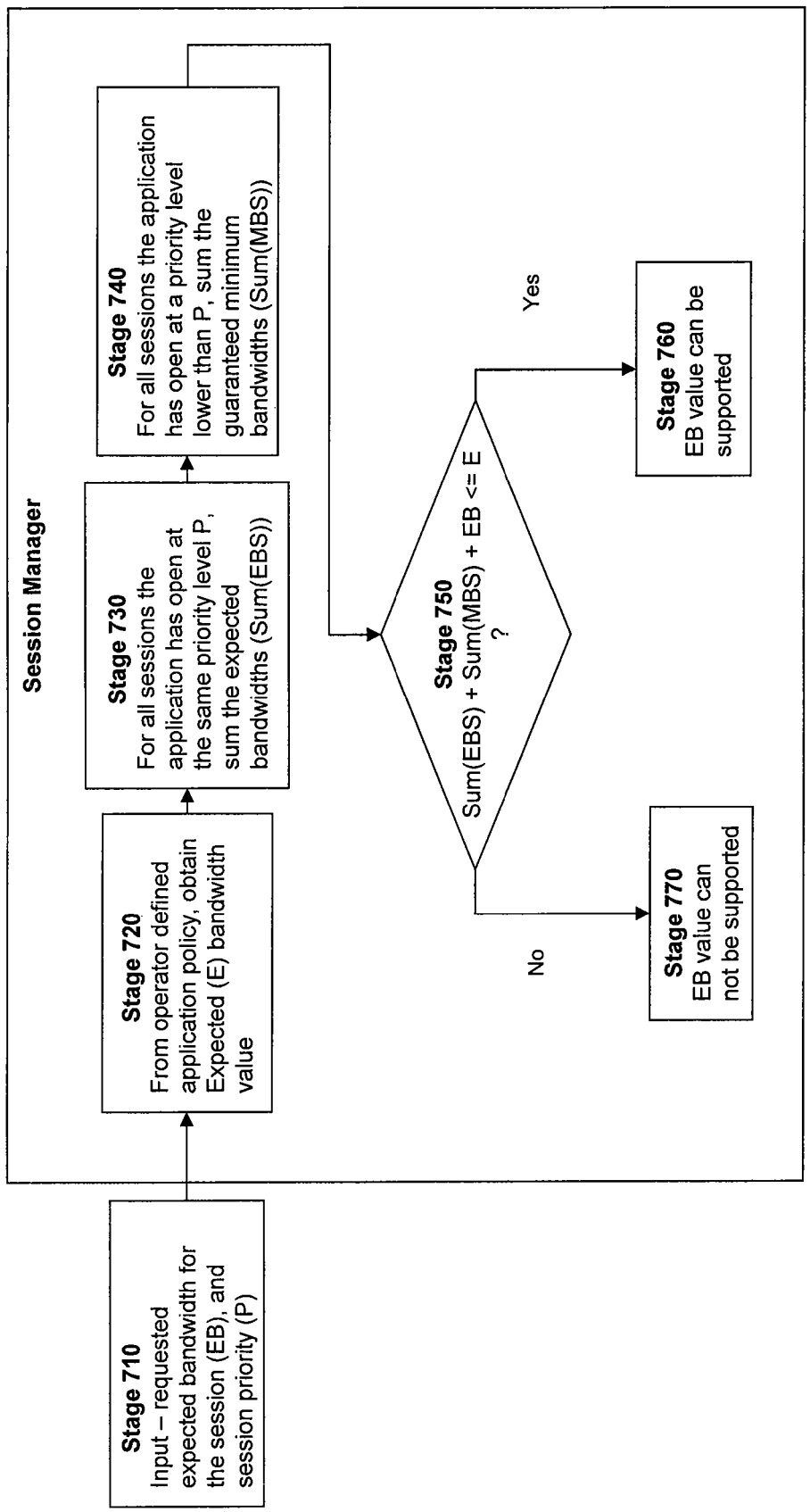
FIG. 7 is a diagram illustrating a process for performing an expected bandwidth check when a session is being created or modified.
Figure 8:
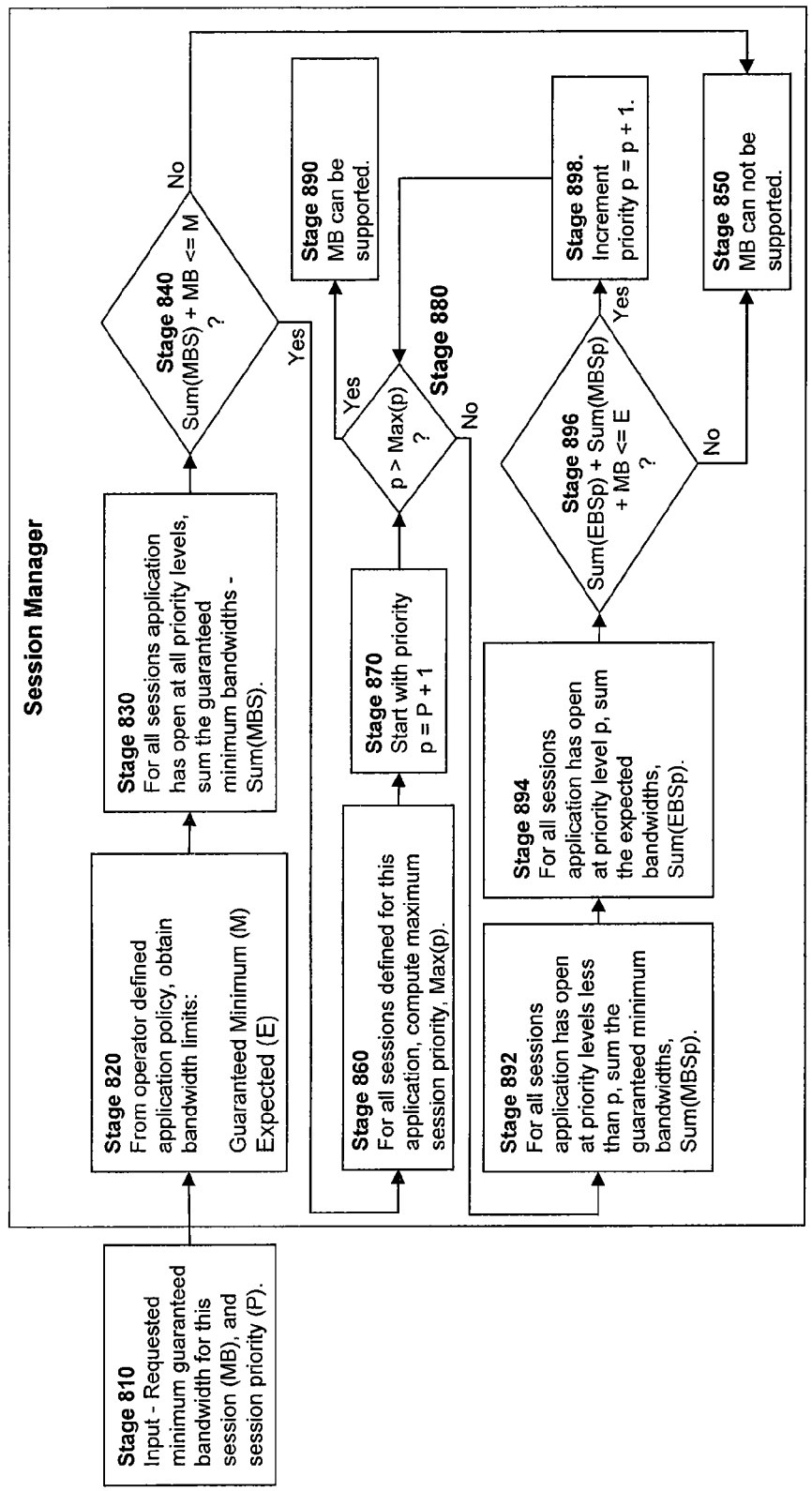
FIG. 8 is a diagram illustrating a process for performing a guaranteed minimum bandwidth check when a session is being created or modified.

FIGS. 6-8 illustrate certain operations of Session Manager 240 that may be utilized in allocating bandwidth to a broadcast session requested by an application. FIG. 6 is a diagram illustrating a process of creating an application session that may be utilized as part of the present invention. In the process that will be described with reference to the figure, an application requests a new or modified session by specifying QoS parameters, although bandwidth amounts or ranges may also be specified. The process to be described is typically implemented as part of the functions or processes performed by Session Manager 240 of Broadcast Server 110.

As shown in FIG. 6, application 130 requests a new or modified session by specifying an expected QoS parameter (EQoS), a priority (P), and optionally a relative minimum QoS (MQoS), maximum QoS (XQoS), and currently desired QoS (DQoS) (stage 610). Session Manager 240 then computes the bandwidth required to support the requested EQoS (EB) (stage 620). The value EB is then tested to determine if it satisfies the operator defined application policy and applicable session policies (as will be described with reference to FIG. 7) (stage 630). If the value fails to satisfy the defined application policy and applicable sessions policies, then the parameter EQoS can not be supported. In this case, Session Manager 240 computes a EQoS value that can be supported and returns that to the application (stage 640). If the EB value satisfies the defined application policy and applicable sessions policies, then Session Manager 240 determines if a MQoS value was specified by the application (stage 650). If such a value was not specified, then the Session Manager allocates bandwidth for this session, reallocating bandwidth for other sessions as needed, and returns to the application all QoS values assigned to this session (stage 660). If a value of MQoS was specified, then the Session Manager computes the bandwidth required to support the MQoS value (MB) (stage 670). Next, the Session Manager determines if the MB value satisfies the relevant operator defined application policy and applicable session policies (as will be described with reference to FIG. 8) (stage 680). If the bandwidth value does satisfy the application and applicable session policies, then the Session Manager allocates bandwidth for this session, reallocating bandwidth for other sessions as needed, and returns to the application all QoS values assigned to this session (stage 660). If the bandwidth value does not satisfy the application and applicable session policies, then the parameter MQoS can not be supported. In this case, Session Manager 240 computes a MQoS value that can be supported and returns that to the application (stage 640).

FIG. 7 is a diagram illustrating a process for performing an expected bandwidth check when a session is being created or modified. As discussed with reference to FIG. 6, in this process the value EB is tested to determine if it satisfies the operator defined application policy and applicable session policies. As shown in FIG. 7, an input to the process is a value for the requested expected bandwidth for the session (EB), and a session priority (P) (stage 710). Next, from the applicable operator defined application policy, the Expected (E) bandwidth value is obtained (stage 720). Next, for all sessions the application already has open at the same priority level P, the process sums the expected bandwidths (Sum(EBS)) (stage 730). Next, for all sessions the application already has open at a priority level lower than P, the process sums the guaranteed minimum bandwidths (Sum(MBS)) (stage 740). Next, the process determines if the following relationship is true or false (stage 750):

$$\text{Sum}(EBS) + \text{Sum}(MBS) + EB <= E$$

If the relationship is true, then the EB value can be supported (stage 760). If the relationship is false, then EB value can not be supported (stage 770).

FIG. 8 is a diagram illustrating a process for performing a guaranteed minimum bandwidth check when a session is being created or modified. As discussed with reference to FIG. 6, in this process the Session Manager determines if the MB bandwidth value satisfies the relevant operator defined application policy and applicable session policies. As shown in FIG. 8, an input to the process is a value for the requested minimum guaranteed bandwidth for the session (MB), and session priority (P) (stage 810). Next, from the operator defined application policy, values for the Guaranteed Minimum (M) and Expected (E) bandwidth limits are obtained (stage 820). Next, for all sessions the application already has open at all priority levels, the process sums the guaranteed minimum bandwidths (Sum(MBS)) (stage 830). The process then determines if the following relationship is true or false (stage 840):

$$\text{Sum}(MBS) + MB <= M$$

If the relationship is false, then the MB value can not be supported (stage 850). If the relationship is true, then for all sessions defined for the application, the process computes the maximum session priority, Max(p) (stage 860). Next, starting with priority value p=P+1 (stage 880), the process determines if p>Max(p) (stage 880). If the result is that the relationship is satisfied, then the MB value can be supported (stage 890). If the result is that the relationship is not satisfied, then for all sessions the application has open at priority levels less than p, the process sums the guaranteed minimum bandwidths, Sum(MBSp) (stage 892). Next, for all sessions the application has open at priority level p, the process sums the expected bandwidths–Sum(EBSp) (stage 894). Next, the process determines if the following relationship is true or false (stage 896):

$$\text{Sum}(EBSp) + \text{Sum}(MBSp) + MB <= E$$

If the relationship is true, then the process increments the priority value p=p+1 (stage 898) and control is passed to stage 880. If the relationship is false, then the MB value can not be supported (stage 850).

Figure 9:
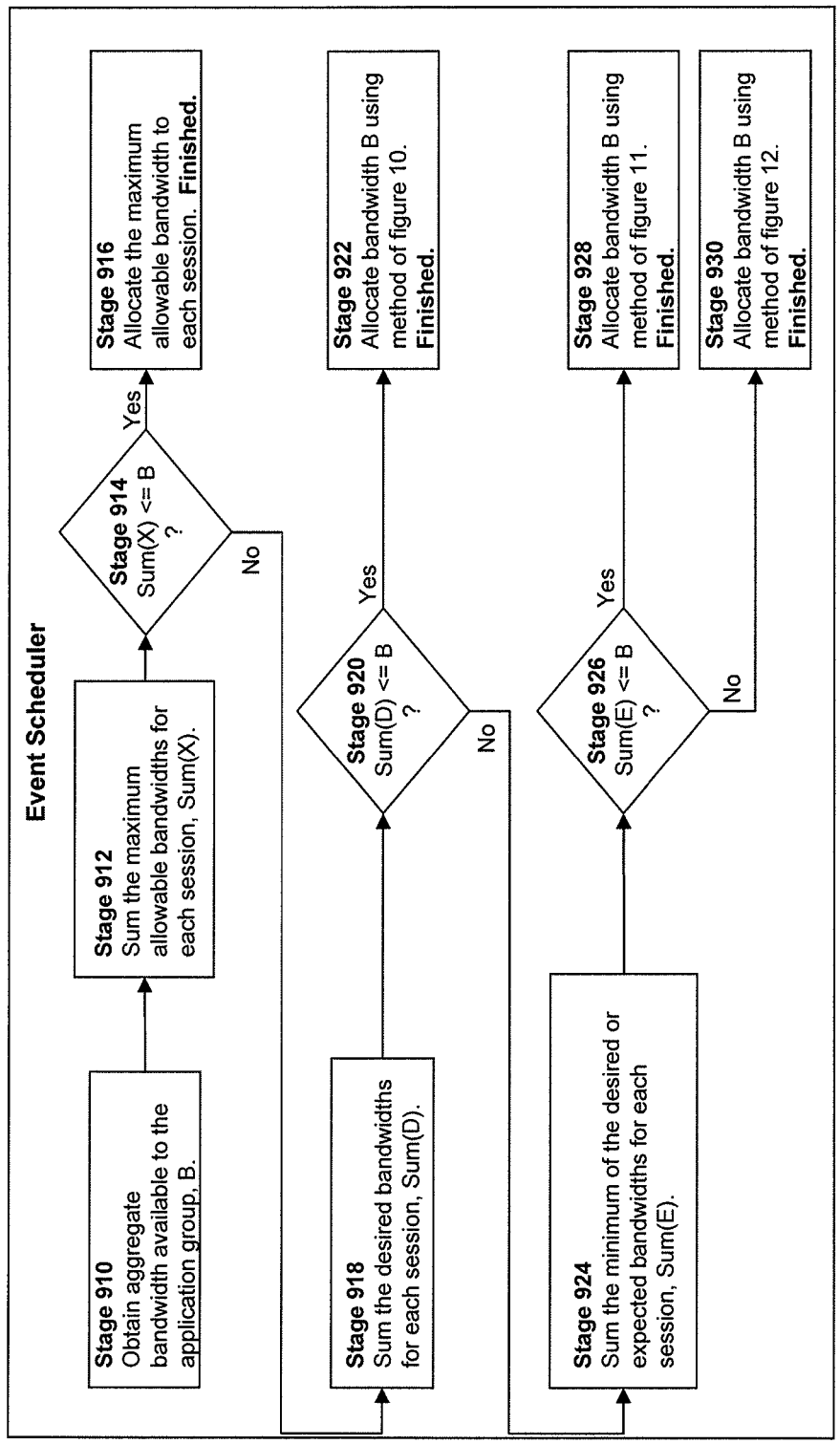
FIG. 9 is a diagram illustrating a process for implementing a bandwidth allocation algorithm.

A bandwidth allocation process suitable for allocating bandwidth among multiple sessions in accordance with an embodiment of the present invention will be described with reference to FIGS. 9-12. FIG. 9 is a diagram illustrating a process for implementing a bandwidth allocation algorithm. As noted in the figure, the stages of the process will typically be implemented as part of the functions performed by Event Scheduler 230. As shown in the figure, the process begins by obtaining the value for the aggregate bandwidth available to the application group, B (stage 910). Next, the process sums the maximum allowable bandwidths for each session, Sum(X) (stage 912). The process then determines if the relationship $$\text{Sum}(X) <= B$$

is true or false (stage 914). If the relationship is true, then the process allocates the maximum allowable bandwidth to each session (stage 916). If the relationship is false, then the process sums the desired bandwidths for each session, Sum(D) (stage 918). The process then determines if the relationship $$\text{Sum}(D) <= B$$

is true or false (stage 920). If the relationship is true, then the process allocates bandwidth B using the method or algorithm described with reference to FIG. 10 (stage 922). If the relationship is false, then the process sums the minimum of the desired or expected bandwidths or the for each session, Sum(E) (stage 924). The process then determines if the relationship $$\text{Sum}(E) <= B$$

is true or false (stage 926). If the relationship is true, then the process allocates bandwidth B using the method or algorithm described with reference to FIG. 11 (stage 928). If the relationship is false, then the process allocates bandwidth B using the method or algorithm described with reference to FIG. 12 (stage 930).

Figure 10:
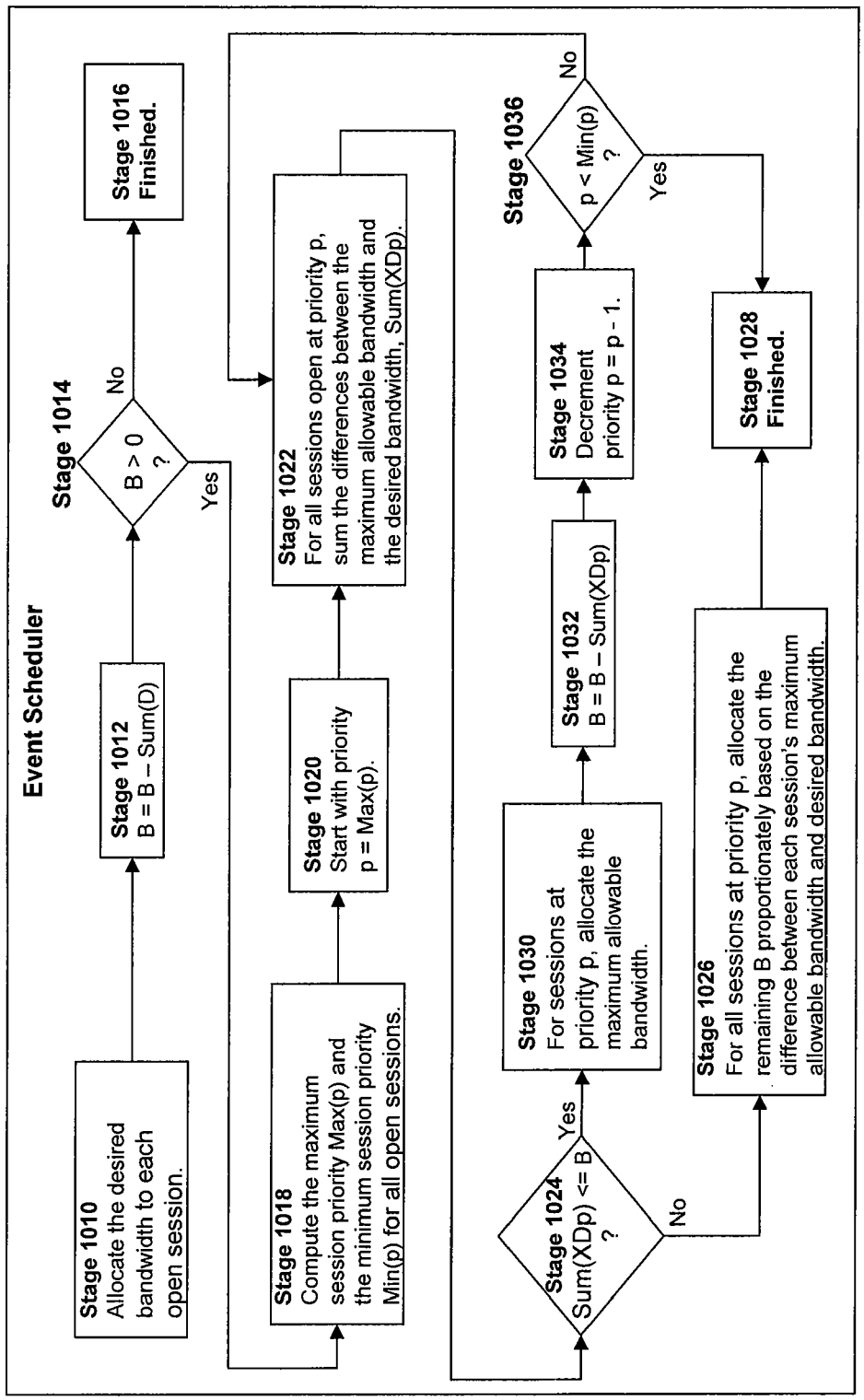
FIG. 10 is a diagram illustrating a process for implementing the bandwidth allocation algorithm of FIG. 9 in the case where the sum of the desired bandwidth (Sum(D)) for all application sessions is less than or equal to the aggregate bandwidth (B) allocated to the application group.

As mentioned, FIG. 10 is a diagram illustrating a process for implementing the bandwidth allocation algorithm of FIG. 9 in the case where the sum of the desired bandwidth (Sum(D)) for all application sessions is less than or equal to the aggregate bandwidth (B) allocated to the application group. The process begins by allocating the desired bandwidth to each open session (stage 1010). The process then determines if there is any aggregate bandwidth that remains un-allocated, by determining $$B = B - \text{Sum}(D) \text{ (stage 1012)}$$

The process then determines if this value is greater then zero (stage 1014). If the value is not greater than zero, then the process terminates (stage 1016). If the value is greater than zero, then the process computes the maximum session priority Max(p) and the minimum session priority Min(p) for all open sessions (stage 1018). The process then starts with the priority value priority p=Max(p) (stage 1020) and for all sessions open at priority p, the process sums the differences between the maximum allowable bandwidth and the desired bandwidth, Sum(XDp) (stage 1022). The process then determines if the relationship $$\text{Sum}(XDp) <= B$$

is true or false (stage 1024). If the relationship is false, then for all sessions at priority p, the process allocates the remaining B proportionately based on the difference between each session's maximum allowable bandwidth and desired bandwidth (stage 1026) and the process terminates (stage 1028). If the relationship is true, then for all sessions at priority p, the process allocates the maximum allowable bandwidth (stage 1030). The process then determines $$B=B-\mathrm{Sum}(XDp) \text{ (stage 1032)}.$$

The process then decrements the priority value by setting p=p−1 (stage 1034). The process then determines if $$p<\mathrm{Min}(p) \text{ (stage 1036)}.$$

If the relationship is true, then the process terminates (stage 1028). If the relationship is false, then the process returns control to stage 1022.

Figure 11:
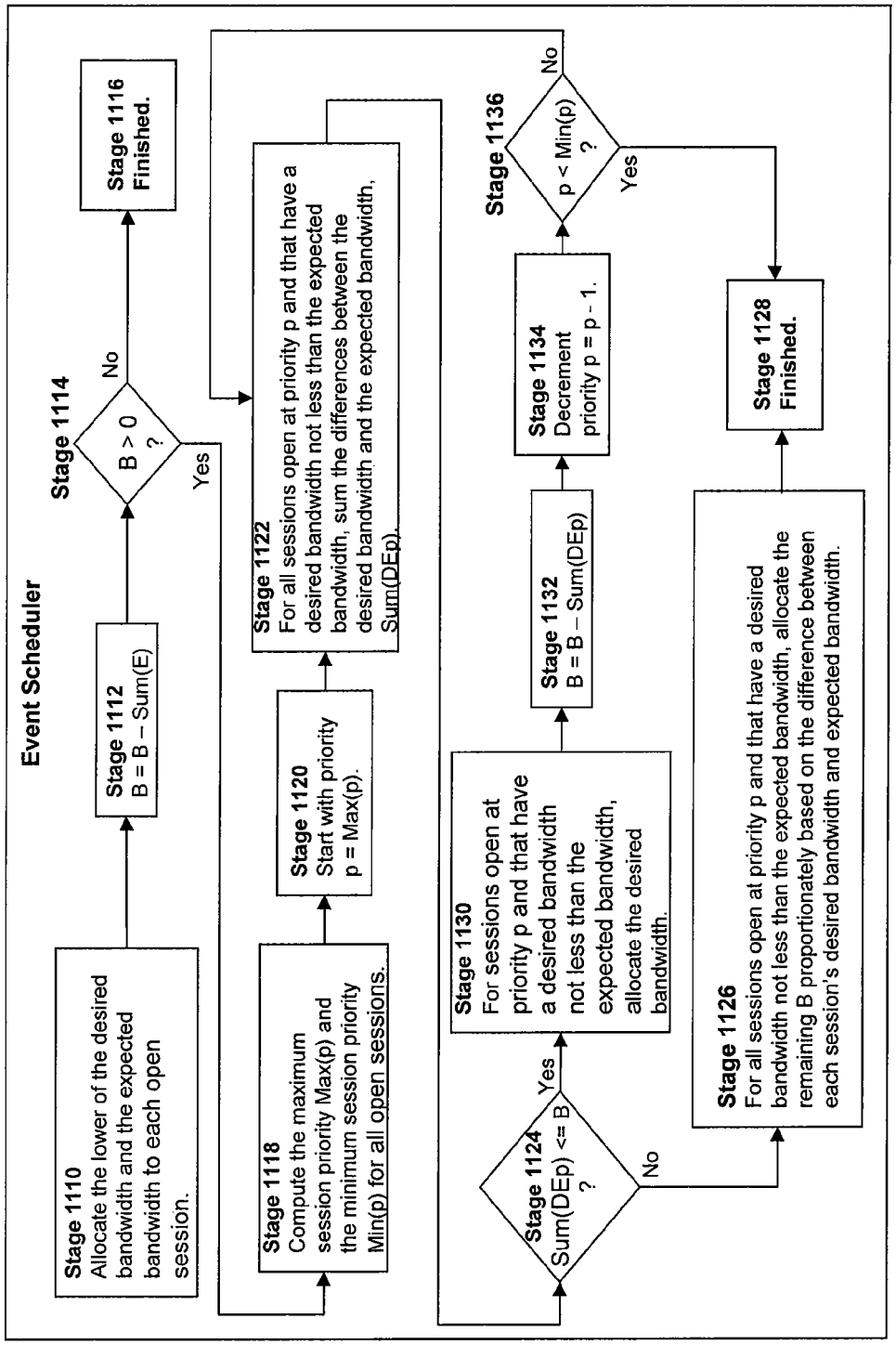
FIG. 11 is a diagram illustrating a process for implementing the bandwidth allocation algorithm of FIG. 9 in the case where the sum of the lower of the desired and expected bandwidth for all application sessions is less than or equal to the aggregate bandwidth allocated to the application group.

FIG. 11 is a diagram illustrating a process for implementing the bandwidth allocation algorithm of FIG. 9 in the case where the sum of the lower of the desired bandwidth and expected bandwidth for all application sessions is less than or equal to the aggregate bandwidth allocated to the application group. The process begins by allocating the lower of the desired bandwidth and the expected bandwidth to each open session (stage 1110). The process then determines if there is any aggregate bandwidth that remains un-allocated, by determining $$B=B-\mathrm{Sum}(E) \text{ (stage 1112)}$$

The process then determines if this value is greater then zero (stage 1114). If the value is not greater than zero, then the process terminates (stage 1116). If the value is greater than zero, then the process computes the maximum session priority Max(p) and the minimum session priority Min(p) for all open sessions (stage 1118). The process then starts with the priority value priority p=Max(p) (stage 1120) and for all sessions open at priority p and that have a desired bandwidth not less than the expected bandwidth, the process sums the differences between the desired bandwidth and the expected bandwidth, Sum(DEp) (stage 1122). The process then determines if the relationship $$\mathrm{Sum}(DEp)<=B$$

is true or false (stage 1124). If the relationship is false, then for all sessions open at priority p and that have a desired bandwidth not less than the expected bandwidth, the process allocates the remaining B proportionately based on the difference between each session's desired bandwidth and expected bandwidth (stage 1126) and the process terminates (stage 1128). If the relationship is true, then for all sessions open at priority p and that have a desired bandwidth not less than the expected bandwidth, the process allocates the desired bandwidth (stage 1130). The process then determines $$B=B-\mathrm{Sum}(DEp) \text{ (stage 1132)}.$$

The process then decrements the priority value by setting p=p−1 (stage 1134). The process then determines if $$p<\mathrm{Min}(p) \text{ (stage 1136)}.$$

If the relationship is true, then the process terminates (stage 1128). If the relationship is false, then the process returns control to stage 1122.

Figure 12:
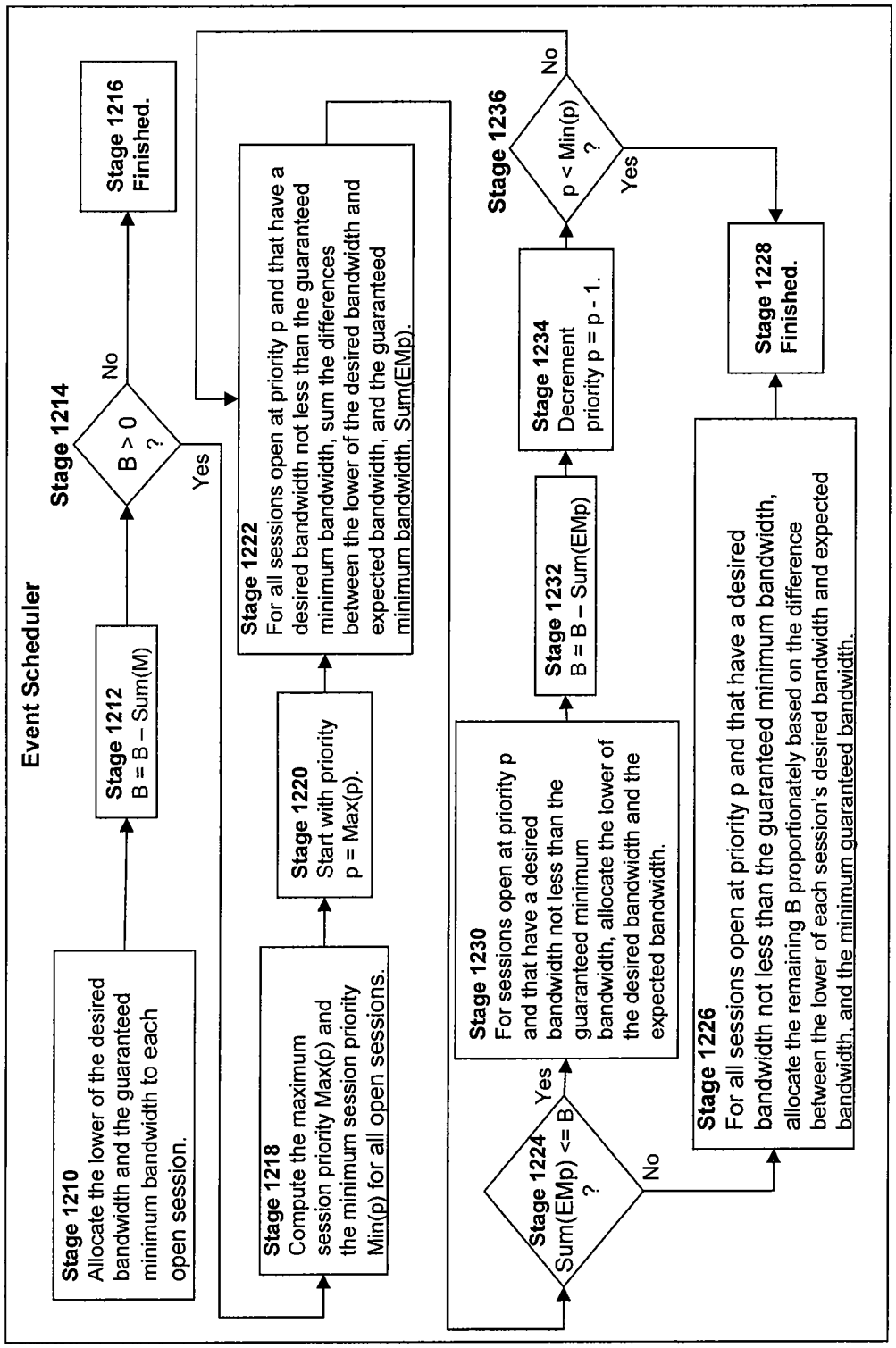
FIG. 12 is a diagram illustrating a process for implementing the bandwidth allocation algorithm of FIG. 9 in the case where the sum of the lower of the desired and guaranteed minimum bandwidth for all application sessions is less than or equal to the aggregate bandwidth allocated to the application group.

FIG. 12 is a diagram illustrating a process for implementing the bandwidth allocation algorithm of FIG. 9 in the case where the sum of the lower of the desired bandwidth and guaranteed minimum bandwidth for all application sessions is less than or equal to the aggregate bandwidth allocated to the application group. The process begins by allocating the lower of the desired bandwidth and the guaranteed minimum bandwidth to each open session (stage 1210). The process then determines if there is any aggregate bandwidth that remains un-allocated, by determining $$B=B-\mathrm{Sum}(M) \text{ (stage 1212)}$$

The process then determines if this value is greater then zero (stage 1214). If the value is not greater than zero, then the process terminates (stage 1216). If the value is greater than zero, then the process computes the maximum session priority Max(p) and the minimum session priority Min(p) for all open sessions (stage 1218). The process then starts with the priority value priority p=Max(p) (stage 1220) and for all sessions open at priority p and that have a desired bandwidth not less than the guaranteed minimum bandwidth, the process sums the differences between the lower of the desired bandwidth and the expected bandwidth, and the guaranteed minimum bandwidth Sum(EMp) (stage 1222). The process then determines if the relationship $$\mathrm{Sum}(EMp)<=B$$

is true or false (stage 1224). If the relationship is false, then for all sessions open at priority p and that have a desired bandwidth not less than the guaranteed minimum bandwidth, the process allocates the remaining B proportionately based on the difference between the lower of each session's desired bandwidth and expected bandwidth, and the minimum guaranteed bandwidth (stage 1226) and the process terminates (stage 1228). If the relationship is true, then for all sessions open at priority p and that have a desired bandwidth not less than the guaranteed minimum bandwidth, the process allocates the lower of the desired bandwidth and the expected bandwidth (stage 1230). The process then determines $$B=B-\mathrm{Sum}(EMp) \text{ (stage 1232)}.$$

The process then decrements the priority value by setting p=p−1 (stage 1234). The process then determines if $$p<\mathrm{Min}(p) \text{ (stage 1236)}.$$

If the relationship is true, then the process terminates (stage 1228). If the relationship is false, then the process returns control to stage 1222.

Temporary Bandwidth Adaptation

The dynamic bandwidth allocations $b_s$ are the nominal bandwidth available to each session. These may be updated as required when a session configuration operation (create, remove, reconfigure session parameters, request dynamic bandwidth) or operator policy change occurs.

During operation, the Broadcast Server may be able to detect that a session is currently underutilizing bandwidth, and that the requested QoS can be maintained with less bandwidth than the currently allocated bandwidth. For example, a data object session may have fewer files on the carousel than expected on average, so that the latency QoS target can be maintained with a packet rate lower than the nominal allocation. In this case, the Broadcast Server may internally reduce the bandwidth used for that session if that bandwidth can be used to meet the QoS request or requirement of another session. In operation, the Event Scheduler internally modifies the desired bandwidth for a session based on the perceived demand and re-computes a dynamic bandwidth re-allocation for the affected sessions. This adjustment may happen as a result of certain kinds of events being published, or may be applied periodically. If the session from which bandwidth has been borrowed later requires its nominal bandwidth, a bandwidth re-allocation process may be used to restore the resources to that application.

Similarly, an application may temporarily send more events than their currently allocated bandwidth or quality of service allows. In that case, as in the situation where an application temporarily sends fewer events than their currently allocated bandwidth or quality of service otherwise allows, it may be possible to adapt the actual bandwidth being used by those sessions without affecting their quality of service.

Without such adaptation, the Broadcast Server would need to inform applications that their quality of service is changing due to their own behavior (as opposed to activity by other applications in the system). Note that in such cases the actual bandwidth allocated to the session does not change, just the quality of service. For example, if an application starts sending events at twice the rate the currently allocated quality of service allows, at the same bandwidth, the quality of service will degrade to half the original value even though the bandwidth being used remains the same. This degradation in QoS may take the form of a longer latency, for example. Alternatively, the application may start sending events at half the rate the current quality of service allows. In that case, the quality of service can double without any change in allocated bandwidth; this might take the form of a shorter latency.

However, using adaptation, the Broadcast Server can use temporary fluctuations in quality of service caused by application session behavior to adapt the actual bandwidth being used by those sessions. The goal of this adaptation is to maintain quality of service across all sessions by temporarily re-allocating bandwidth as needed. For example, bandwidth may be borrowed from sessions where the quality of service might have otherwise been temporarily increased and reallocated to sessions where the quality of service might have otherwise been temporarily decreased.

The Event Scheduler is responsible for this adaptation process and in one embodiment may do so via the following steps:

1. Periodically scan sessions to determine if their current quality of service differs from what has been allocated;
   a. For maximum granularity, this would happen each time an event is added to or removed from any session's event carousel;
2. If the quality of service could be increased:
   a. If the application has indicated that it would not take advantage of the additional quality of service, or if the change in the quality of service is below a certain threshold, determine the reduction in bandwidth that can be made to maintain the currently allocated quality of service;
      i. Store this bandwidth value in an adaptation table that indicates that it is available to be temporarily used by another application session;
   b. If the application can take advantage of the quality of service, and the change in quality of service is above some threshold, compute the new relative quality of service and inform the application that the session's quality of service has increased;
3. If the quality of service needs to be decreased:
   a. if the change in the quality of service is below a certain threshold, determine the increase in bandwidth that would be needed to maintain the currently allocated quality of service;
      i. Store this bandwidth value in an adaptation table that indicates that this application could use additional bandwidth;
   b. If the change in quality of service is above some threshold, compute the new relative quality of service and inform the application that the session's quality of service has decreased;
4. Based on entries in the adaptation table, allocate the excess bandwidth available to applications that need more bandwidth using a bandwidth distribution algorithm.

A threshold to determine whether to give up bandwidth, borrow bandwidth or to inform the application of a quality of service change can be time-based, percentage-change based, or a combination of both. For example, the threshold could be specified as a change that:
   lasts more than 10 seconds;
   is more than 10%; or
   is more than 5% and lasts longer than 5 seconds.

An example of a bandwidth distribution algorithm that can be used to allocate additional bandwidth from applications that have excess bandwidth to applications that could use additional bandwidth is:
1. Sum the additional bandwidth requested by all application sessions in the system;
2. Sum the additional bandwidth available from all sessions in the system;
3. If the sum of the additional bandwidth requested is less than the sum of what is available, starting at the lowest priority and continuing until all bandwidth requests have been met:
   a. Sum the excess bandwidth available from all sessions at this priority level;
   b. If the sum is less than the bandwidth requests outstanding, allocate all bandwidth to sessions with such requests and continue with the next highest priority level;
   c. If the sum is more than the bandwidth requests outstanding, take a proportional amount of the excess bandwidth from each session and allocate it to the requesting sessions. Finished.
4. If additional bandwidth requested is more than what is available, starting at the highest priority and continuing while there is excess bandwidth available:
   a. Sum the bandwidth requests for all sessions at this priority level;
   b. If the sum is less than the excess bandwidth available, allocate the excess bandwidth to all sessions at this priority level and continue with the next lower priority level;
   c. If the sum is more than the excess bandwidth available, allocate the excess bandwidth in proportion to the requests of each session. Finished.

Figure 13:
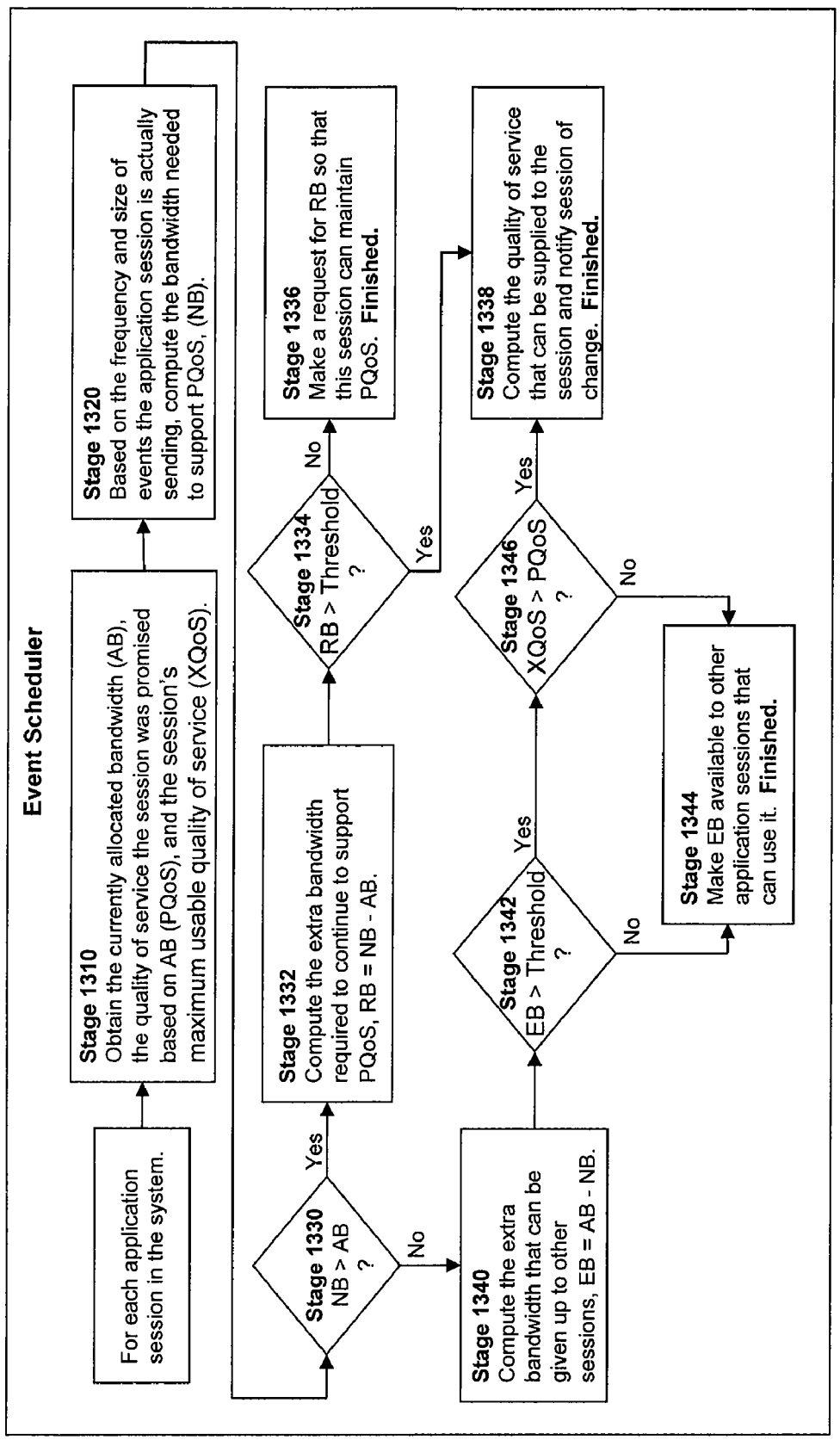
FIG. 13 is a diagram illustrating a process for determining which applications may participate in a bandwidth adaptation or reallocation process by giving up bandwidth or requesting additional bandwidth.

A bandwidth adaptation or reallocation process suitable for implementation as part of the present invention will be described with reference to FIGS. 13-15. FIG. 13 is a diagram illustrating a process for determining which applications may participate in a bandwidth adaptation or reallocation process by giving up bandwidth or requesting additional bandwidth. The process begins by, for each application session, obtaining the currently allocated bandwidth (AB), the quality of service the session was promised based on AB (PQoS), and the session's maximum usable quality of service (XQoS) (stage 1310). Next, based on the frequency and size of events the application session is actually sending, the process computes the bandwidth needed to support PQoS (NB) (stage 1320). The process then determines whether NB>AB (stage 1330). If the relationship is true, then the process computes the extra bandwidth required to continue to support PQoS, RB=NB−AB (stage 1332). The process then determines if RB>Threshold (stage 1334). If this relationship is not true, then the process makes a request for RB so that this session can maintain the PQoS and the process terminates (stage 1336). If, however, the relationship determined at stage 1334 is true, then the process computes the quality of service that can be supplied to the session, notifies the session of the change and the process is terminated (stage 1338). Returning to the description of stage 1330, if the relationship determined at that stage is false, then the process computes the extra bandwidth that can be given up to other sessions, EB=AB−NB (stage 1340). The process then determines if EB>Threshold (stage 1342). If this relationship is not true, then the process makes EB available to other application sessions that can use it (stage 1344). If, however, the relationship determined at stage 1342 is true, then the process determines if XQoS>PQoS (stage 1346). If this relationship is true, then the process passes control to stage 1338. If this relationship is false, then the process passes control to stage 1344.

Figure 14:
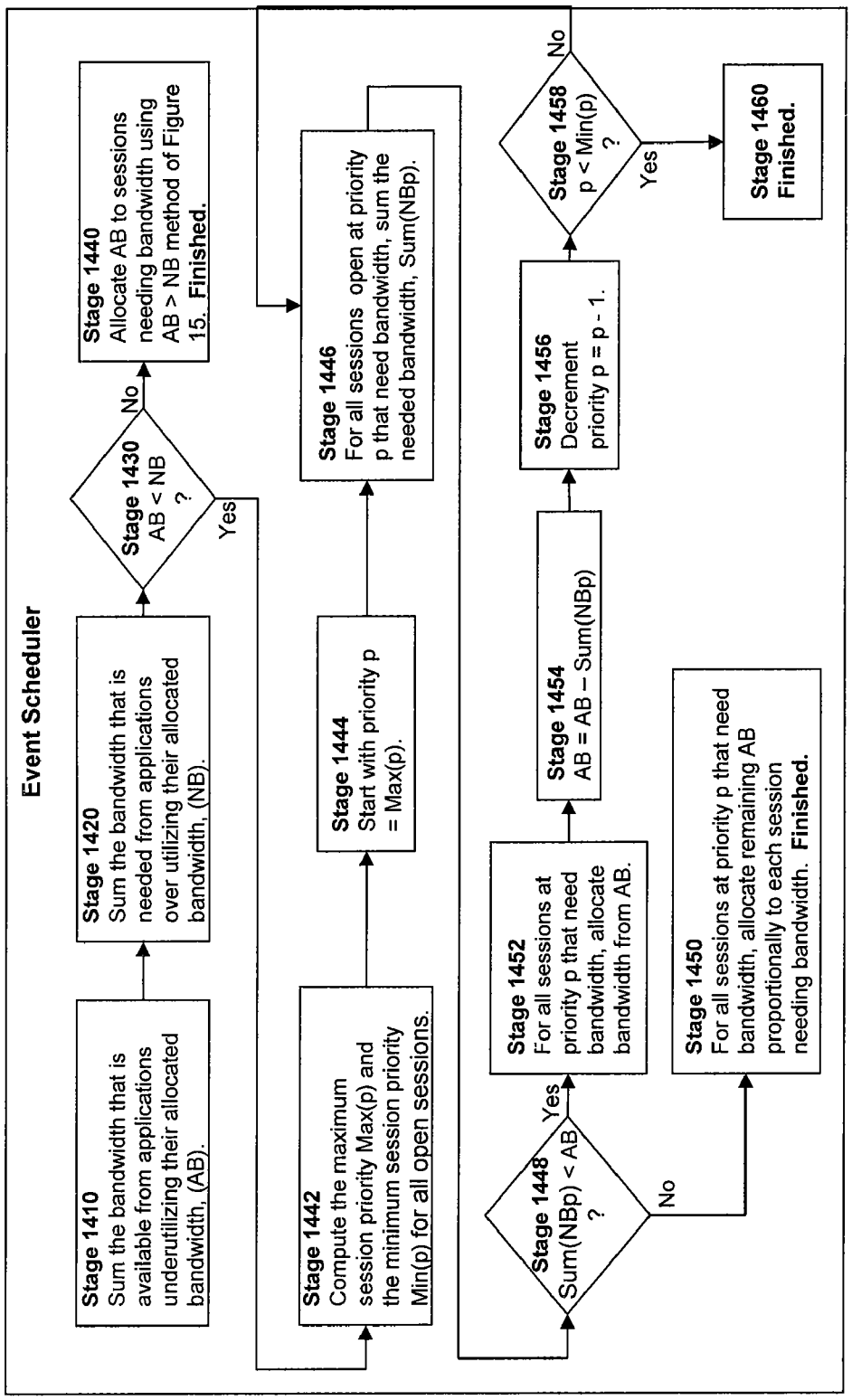
FIG. 14 is a diagram illustrating the manner in which bandwidth adaptation or re-allocation occurs when the sum of the available bandwidth is less than the sum of the requested bandwidth.

FIG. 14 is a diagram illustrating the manner in which bandwidth adaptation or re-allocation occurs when the sum of the available bandwidth is less than the sum of the requested bandwidth. The process begins by summing the bandwidth that is available from applications underutilizing their allocated bandwidth (AB) (stage 1410). The process then sums the bandwidth that is needed from applications over utilizing their allocated bandwidth (NB) (stage 1420). The process then determines if AB<NB (stage 1430). If the relationship is false, then the process allocates AB to sessions needing bandwidth using the AB>NB method to be described with reference to FIG. 15 and the process terminates (stage 1440). If the relationship determined at stage 1430 is true, then the process computes the maximum session priority Max(p) and the minimum session priority Min(p) for all open sessions (stage 1442). Next, the process sets the priority value to p=Max(p) (Stage 1444). Then, for all sessions open at priority p that need bandwidth, the process sums the needed bandwidth Sum(NBp) (stage 1446). Next, the process determines if the relationship $$\text{Sum}(NBp) < AB$$

is true or false (stage 1448). If the relationship is false, then for all sessions at priority p that need bandwidth, the process allocates remaining AB proportionally to each session's needed bandwidth and the process terminates (stage 1450). If the relationship determined at stage 1448 is true, then for all sessions at priority p that need bandwidth, the process allocates bandwidth from AB (stage 1452). Next, the process determines $$AB = AB - \text{Sum}(NBp) \text{ (stage 1454)}.$$

The process then decrements the priority value by setting p=p−1 (stage 1456). The process then determines if p<Min(p) (stage 1458). If this relationship is true, then the process terminates (stage 1460). If this relationship is false, then the process passes control to stage 1446.

Figure 15:
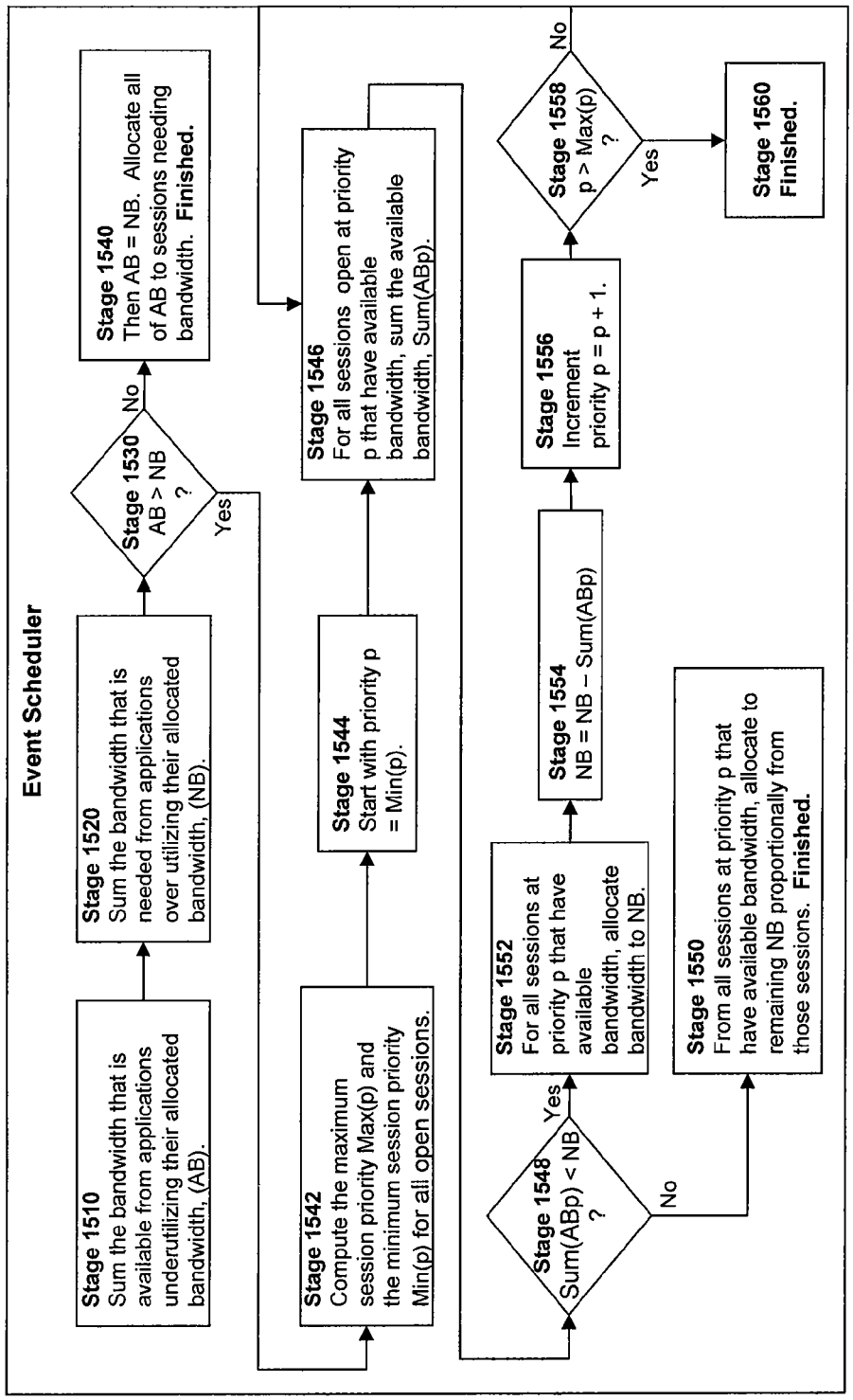
FIG. 15 is a diagram illustrating the manner in which bandwidth adaptation or re-allocation occurs when the sum of the available bandwidth is greater than or equal to the sum of the requested bandwidth.

FIG. 15 is a diagram illustrating the manner in which bandwidth adaptation or re-allocation occurs when the sum of the available bandwidth is greater than or equal to the sum of the requested bandwidth. The process begins by summing the bandwidth that is available from applications underutilizing their allocated bandwidth (AB) (stage 1510). The process then sums the bandwidth that is needed from applications over utilizing their allocated bandwidth (NB) (stage 1520). The process then determines if AB>NB (stage 1530). If the relationship is false, then the process realizes that AB=NB and allocates AB to sessions needing bandwidth and the process terminates (stage 1540). If the relationship determined at stage 1530 is true, then the process computes the maximum session priority Max(p) and the minimum session priority Min(p) for all open sessions (stage 1542). Next, the process sets the priority value to p=Max(p) (Stage 1544). Then, for all sessions open at priority p that have available bandwidth, the process sums the available bandwidth Sum(ABp) (stage 1546). Next, the process determines if the relationship $$\text{Sum}(ABp) < NB$$

is true or false (stage 1548). If the relationship is false, then for all sessions at priority p that have available bandwidth, the process allocates bandwidth to the remaining application needing bandwidth NB proportionally from those sessions and the process terminates (stage 1550). If the relationship determined at stage 1548 is true, then for all sessions at priority p that have available bandwidth, the process allocates bandwidth to those applications needing bandwidth NB (stage 1552). Next, the process determines $$NB = NB - \text{Sum}(ABp) \text{ (stage 1554)}.$$

The process then increments the priority value by setting p=p+1 (stage 1556). The process then determines if p>Max(p) (stage 1558). If this relationship is true, then the process terminates (stage 1560). If this relationship is false, then the process passes control to stage 1546.

QoS Management

As discussed, in one sense, Quality of Service (QoS) refers to the ability of the system to successfully deliver data/events from server applications to client applications in a timely manner. Applications may define the quality of service they desire for their sessions, and the inventive system will attempt to satisfy those requests within the constraints set by the network operator and based on other activity in the broadcast system. As resources become constrained due to additional application requests, the broadcast system may need to modify the quality of service for one or more sessions to meet the new demand and maintain its ability to fulfill its overall QoS obligations.

One or more of the following characteristics may be defined by an application to request a particular quality of service for a session:
  Event size
  Event frequency
  Error correction (FEC)
  Number of retransmissions for each event, or event linger time (how long the event remains on the carousel for retransmission)
  Number of events to be retained on the event carousel
  Event latency (the time it takes for an event to reach the client)
  Carousel cycle time.
Event size refers to the size, in bytes, of each event. Applications may have a fixed or variable event size.
Event frequency refers to the rate at which new events are generated. For some applications, events are generated at relatively fixed intervals, such as a stock ticker application. For other applications events may occur at unpredictable times, such as a news or traffic application.
Error correction, such as FEC, increases the amount of data that needs to be broadcast for each event, but increases the likelihood that the event is received without errors at the client device.
Number of retransmissions refers to how many times an event should be broadcast before being taken off the carousel. An application session may want to broadcast events multiple times so that client devices that are leaving and entering the network (or otherwise have intermittent connectivity) have an opportunity to receive events that may have been missed while off the network.
Event linger time is another way to specify rebroadcast. Linger time refers to the amount of time an event should remain on the carousel. The event will be rebroadcast as long as it remains on the carousel. The number of times the event gets rebroadcast will depend on the total number of events on the carousel. Applications may specify linger time when an event is relevant for a particular amount of time, after which it is no longer important or usable.

Number of events to be retained on the event carousel can be used by applications that want to offer a certain amount of history. The Broadcast Server will automatically remove old events as new ones are added once the carousel reaches the specified size.

Event latency refers to the amount of time it takes for an event to be received by the client. The latency is dependent on the amount of data that needs to be transmitted as well as the number of events ahead of it in the carousel.

Carousel cycle time refers to the amount of time needed to broadcast the entire contents of the event carousel. An application may want to allow the number of events on its carousel to vary over time in order to maintain a fixed carousel cycle time.

The quality of service an application session receives is primarily dependent on the bandwidth allocated to that session. However, bandwidth may be reallocated in a variety of ways to support achieving or optimizing the various QoS characteristics defined previously. This allows different aspects of the quality of service to be affected when bandwidth changes. The application may define what aspects of the quality of service to affect and in what manner when the allocated bandwidth changes, or the Broadcast Server may choose what aspects or characteristics to affect in cases where the application has not defined a policy.

In general, applications are not aware, or need not be aware of the bandwidth allocated to a particular session. Applications are typically more concerned about the quality of service they are experiencing, and more specifically, about how the currently allocated bandwidth affects the various quality of service parameters that are of interest to the application. For example, an application may only care or be most concerned about event linger time, and would want to know how changes in its allocated bandwidth affect event linger time.

The bandwidth allocated to an application session determines how much data can be transmitted over a defined period of time. In this sense, the bandwidth required to support an application session is dependent on the desired latency and how much data that session is attempting to transmit. The amount of data an application session transmits is dependent on the event size, how frequently events are generated, and the various reliability mechanisms that may be used that increase the amount of data that needs to be sent for each event, such as error correction or multiple data retransmissions.

In typical operation, applications may not ask for an actual bandwidth value when setting up a session. Instead, an application may have certain quality of service requirements that can be translated into actual bandwidth values (as discussed, for example, with reference to the description of FIG. 6). Typically, what is important to the application is how the quality of service changes in relation to bandwidth changes. For that reason, the application may be told the relative quality of service range that it will be subject to under certain operating conditions. For example, a QoS value of 100 may be assigned to indicate the desired quality of service that the application initially requests. Based on the application request and the application policies set up by the operator, the Broadcast Server can determine relative floor and ceiling values for quality of service that the application will be subject to. If the application request translates into a bandwidth of 10 Kb/s for example, and the application may be reduced to a minimum of 5 Kb/s or increased to a maximum of 20 Kb/s, the application could be told that based on a relative value of 100 for the initial request, it may be reduced to a value of 50 or increased to a value of 200. The application can then use that information to set up policies that the Broadcast Server implements if the allocated bandwidth fluctuates.

As mentioned, the quality of service requirements that applications provide to the Broadcast Server when setting up a session depend somewhat on the type of service the application is providing. For each of the three basic types of applications, an event stream service, a notification service, and a data object delivery service, there are one or more associated QoS parameters that are typically of greatest interest. The quality of service parameters that are typically important to an event stream service include average event size and frequency, and the desired event latency and linger time. The quality of service parameters that are typically important to a notification service are maximum notification size, the desired latency, and the maximum latency for delivering the notification. The quality of service parameters that are typically important to data object delivery services include the average object size, the average number of objects to be contained on the carousel, and the desired object latency.

As discussed with reference to FIG. 6, when setting up or modifying a session, an application may provide the quality of service parameters for the expected quality of service level that the application desires. This typically defines a baseline quality of service level that the application requires to operate normally, with the understanding that it is possible that preemption will cause the quality of service to temporarily drop below that level. Additionally, the application can supply the quality of service level that the application normally wants to operate at, which can be higher than the expected quality of service. The application may also specify a maximum quality of service value that it can take advantage of, and a minimum guaranteed quality of service that it can operate at. These additional quality of service values are typically specified relative to the expected quality of service. For example, an application opening an event stream session may specify its expected quality of service as follows:

| | |
|---|---|
| Average Event Size: | 1 Kb |
| Average Event Frequency: | 2 events/second |
| Expected Latency: | 5 seconds |
| Expected Linger Time: | 10 seconds |

Knowing that these requirements will correspond to a base level of quality of service, for example a value of 100, the application may optionally specify additional relative quality of service requirements:

| | |
|---|---|
| Desired Quality of Service: | 150 |
| Maximum Usable Quality of Service: | 200 |
| Minimum Guaranteed Quality of Service: | 50 |

The Session Manager will evaluate these QoS levels to determine the actual bandwidth levels that correspond to each quality of service level the application has requested. Based on those actual bandwidth levels, the Session Manager can compare the QoS level requests to the application policy associated with the application to determine if the expected, minimum guaranteed, and maximum bandwidth requirements can be met. If the minimum bandwidth requirements can not be met, then the session request will be denied, and feedback provided to the application as to what policy constraint caused the denial. If the minimum bandwidth requirements can be met, the Session Manager will compute the maximum quality of service that can be supplied to the session based on the application's requirements and the associated application policy.

Note that the maximum QoS level may be less than what the application specified that it can take advantage of. Based on the current bandwidth allocations to the other application sessions currently defined, the Session Manager will allocate the actual bandwidth initially given to the application. The Session Manager then provides the application with the quality of service levels assigned to the application, which will be relative to the expected quality of service the application specified. For example, the Broadcast Server may assign the value 100 to correspond to the expected quality of service, and return to the application the relative values for the other quality of service levels:

| Quality of Service (QoS) Type | Bandwidth | Relative QoS |
| --- | --- | --- |
| Expected QoS | 20 Kb/s | 100 |
| Minimum Guaranteed QoS | 10 Kb/s | 50 |
| Maximum Usable QoS | 40 Kb/s | 200 |
| Currently Allocated QoS | 30 Kb/s | 150 |

As may be expected, when a new application session is set up, it may affect the bandwidth allocated to other applications' sessions. The new session will request an allocation of bandwidth, and some or all of that bandwidth may need to come from other sessions. The same situation may occur when an application changes its session parameters. The change may result in a request for more or less bandwidth, where the extra bandwidth may have to come from other sessions, or the bandwidth given back to the system can be allocated to other sessions. Similarly, when an application session is closed, the bandwidth used by that session can be allocated to other sessions.

As mentioned, an application can supply a callback function when setting up a session so that changes in the session's allocated bandwidth can be communicated back to the application. When notified, an application can choose to alter its behavior based on such feedback. This may involve changing the size and frequency of the events it is broadcasting, or supplying a different set of quality of service parameters to the session manager to be applied to the affected session. Alternatively, the application may wish to set up a policy which the Broadcast Server implements when allocated bandwidth for the session changes. One way to do this is for the application to specify its initial quality of service parameter values, and supply a method to be used to alter those values as quality of service changes, or explicitly supply values for those parameters at the various quality of service levels the application may be subjected to.

As noted, different classes of application sessions may specify different aspects of quality of service, as those aspects may be most relevant to that type of application. For example, event stream services may only specify a desired average latency for new events. Data object delivery services may be more interested in specifying the linger time for objects maintained on the event carousel. Emergency notification services may require that a rich event be rebroadcast as many times as possible for a short period of time, followed by an abbreviated version of that event broadcast at a lower rate for a longer period of time.

Management of QoS Level Changes

If an application session's allocated bandwidth decreases due to the needs of other application sessions in the system, then the quality of service that session receives may need to be reduced. There are a number of ways in which the quality of service reduction can be implemented. Two basic approaches are to increase latency and/or to reduce the amount of data that needs to be broadcast.

Increasing latency is relatively straightforward as no action needs to be taken other than to inform the application session of the change. Events are broadcast at the new, lower allocated bandwidth, and the application may need to reduce the frequency with which new events are generated. This is because a failure to do so may cause a continued increase in latency if new events are generated more frequently than they can be broadcast.

Reducing the amount of data that needs to be broadcast can be accomplished in a number of ways. These methods may or may not involve a reduction in the event frequency or size:

- For sessions using error correction, such as FEC, discontinuing the error correction will reduce the amount of data that needs to be broadcast for each event;
- Reducing events' linger time will also reduce the amount of data that needs to be sent. Each event will spend less time on the carousel, thus reducing the number of times it gets rebroadcast. This can also be accomplished by explicitly reducing the number of times an event gets rebroadcast;
- For application sessions specifying the number of objects to retain on the event carousel, reducing the number will also reduce the total amount of data that needs to be broadcast; or
- Applications may voluntarily reduce the frequency at which they send events, or reduce the event size in order to reduce the amount of data that needs to be broadcast. Under some circumstances, the Broadcast Server may refuse to accept new events if a combination of a low allocated bandwidth and a large carousel size warrant doing so.

Due to the number of ways that changes in quality of service can be managed, the application may define policies that the Broadcast Server implements when the bandwidth allocated to an application session changes. As an example, the Broadcast Server may apply the following steps to alter an application's quality of service based on bandwidth changes:

1. Compute the relative quality of service value that corresponds to the currently available bandwidth. This value is relative to the expected quality of service that the application originally requested, and the actual bandwidth that that request corresponded to;
2. If the application has defined a quality of service policy that indicates what quality of service parameters can be changed for the corresponding quality of service value computed above, take the action specified by the application and inform the application of such action; or
3. If the application has not specified an automatic action to be taken, notify the application that quality of service has changed to the value computed above, and give the application the opportunity to change quality of service parameters to support the new level
    a. If the application takes no action, change the quality of service parameters using a default algorithm that ensures that events already added to the session's carousel get broadcast at least one time, even if latency must be increased, and reject new events if the carousel size reaches some maximum size.

The way in which QoS degradation is implemented in the situation of a bandwidth re-allocation can be predefined when the session is first set up, or can be determined in real-time by the application. If predefined at session set up, then the Broadcast Server handles most QoS changes for the application session. For example, the application session may specify the following characteristics:

| Event Rate: | 2 events/second |
|---|---|
| Event Size: | 1 Kb |
| FEC: | Yes (doubles size of event) |
| Broadcast each event: | 5 times |
| Desired Latency: | 1 second |

Based on the initial request, and assuming the applicable policy and current bandwidth allocation allow, this application session will be allocated a bandwidth of 20 Kb/s. With the FEC, each event broadcast will be 2 Kb. At two events per second, the application will be adding 4 Kb/s to the carousel. Since each event will be broadcast 5 times, 5*4 Kb/s, or 20 Kb/s will effectively be added to the carousel. With one second desired latency, the carousel will need to transmit events at 20 Kb/s.

If the minimum guaranteed bandwidth for this application is 1 Kb/s, then the application needs to be prepared to have its allocated bandwidth drop to that level if higher priority events enter the system. Note that the allocated bandwidth may fluctuate between 1 Kb/s and the originally allocated 20 Kb/s depending on other activity in the system. For the present example, assume the application will not take advantage of additional bandwidth beyond 20 Kb/s.

In this example, a QoS value of 100 for the initial request will be returned to the application, which corresponds to the expected bandwidth of 20 Kb/s, and a QoS value of 5, which corresponds to the minimum guaranteed bandwidth of 1 Kb/s.

As noted, the application may define a QoS change policy to handle bandwidth fluctuations. The application knows that it can not be allocated a relative QoS value less than 5, which corresponds to its guaranteed minimum bandwidth. Based on the application's indication that it will not use additional bandwidth, it will not receive a QoS value greater than 100, which corresponds to its expected bandwidth. Thus, the application would need to define what QoS parameters to change for the range of 5 to 100. One example of a possible QoS change policy is as follows:

| Quality of Service Value | Corresponding Bandwidth | Action |
|---|---|---|
| >50 | >10 Kb/s | If necessary, reduce number of broadcasts as needed to keep latency at 1 second |
| >=10 and <=50 | >=2 and <=10 Kb/s | Remove FEC, then, if needed, reduce number of broadcasts to keep latency at 1 second |
| >=5 and <10 | >=1 and <2 Kb/s | Allow latency to increase to a maximum of 10 seconds, then start rejecting new events |

Given the above QoS change policy, the Broadcast Server will attempt to reduce QoS as follows down to 2 Kb/s:

| Allocated Bandwidth | FEC? | Broadcasts | Latency |
|---|---|---|---|
| =20 Kb/s | Yes | 5 | 1 sec |
| >15 Kb/s to <20 Kb/s | Yes | 4 | 1 sec |
| >10 Kb/s to <15 Kb/s | Yes | 3 | 1 sec |
| =10 Kb/s | No | 5 | 1 sec |
| =8 Kb/s to <10 Kb/s | No | 4 | 1 sec |
| =6 Kb/s to <8 Kb/s | No | 3 | 1 sec |
| =4 Kb/s to <6 Kb/s | No | 2 | 1 sec |
| =2 Kb/s to <4 Kb/s | No | 1 | 1 sec |
| >=1 Kb/s to <2 Kb/s | No | 1 | >1 sec to =10 sec |

In operation, if the allocated bandwidth goes below 2 Kb/s, then the Broadcast Server will continue to allow new events to be placed on the carousel even though event latency will start increasing. As long as latency does not exceed 10 seconds, the Broadcast Server will accept new events. If the reduction in allocated bandwidth lasts for a sufficiently short time that the latency does not exceed 10 seconds, then no events need to be dropped. As allocated bandwidth increases, the Broadcast Server will wait until latency is reduced to one second before considering adding broadcasts or FEC according to the table above. If the reduction in allocated bandwidth lasts long enough to increase latency to 10 seconds, then the Broadcast Server will reject new events as needed to keep the latency at a maximum of 10 seconds.

The application will be notified of each change in allocated bandwidth, and of the QoS change the Broadcast Server makes on behalf of the application according to the policy in effect. The application may use this information to modify its behavior, change the content of the events it is broadcasting, or alter the QoS policy. In a situation where a QoS level management policy has been defined, the application is not required to take any action, since the Broadcast Server handles QoS changes automatically based on the policy defined when the session was set up.

Additional Operational and Management Functions Supported by System

The Broadcast Server and Broadcast Client Toolkit also support other operational and management functions that provide value in the broadcast and delivery of data and events, e.g., in-order event delivery. Since events are broadcast using a data carousel, and clients may start receiving the broadcast at any point or time, the client may receive events out of order. In that case, the Broadcast Client Toolkit may detect that it is missing the earlier events and cache events until the earlier events are received. Once received, all events can be delivered to the application(s) in the intended order. To accomplish this, the Broadcast Server may add an event ID to each event it broadcasts. The Broadcast Client Toolkit can then examine the event IDs to determine whether it has received all prior events before sending that event to the client application.

There may be situations where the client begins receiving events at a point where not all prior events are being (re)broadcast, or has temporarily left the network and missed too large a range, and will be unable to receive all missed events. In such a situation, the Broadcast Client Toolkit would need to realize that it will not have access to all prior events and start passing on the earliest event it has cached to the client application. This can be accomplished in one of several ways. The Broadcast Server can add to each event the ID of the earliest event on the carousel. The Broadcast Client Toolkit can use that information to determine when to start sending events to the client application. An alternative method would be for the Broadcast Server to send a table of contents that describes what is currently on the carousel. The Broadcast Client Toolkit can use this information to determine what events it can expect to get and act accordingly. Applications may also specify that events received out of order should be ignored. In that case, if the Broadcast Client Toolkit receives an event that has an earlier ID than events already received and processed, that event may be discarded.

Note that when an application is notified of a change in QoS, it may need to change the type of events being broadcast. For example, if an application's allocated bandwidth drops significantly, it may decide to enter a mode of operation which uses a different event stream than the one it previously used. Since it may take some time for the previously broadcast events to clear the carousel, the application may be given the ability to immediately flush all events in a carousel so that the new event stream can be supported as quickly as possible.

Another feature that may be provided by the Broadcast Server provides is event replacement. This is useful when an event supersedes another event. In such cases, it is an inefficient use of resources to have both the older event and the new event on the data carousel at the same time. For example, in a stock-ticker application, a stock may be trading actively. The application may have stock price changes for the last 50 stocks whose price has changed on the data carousel to support clients that are coming in and out of the network. If a stock quote already exists on the carousel when a new quote needs to be broadcast, the Broadcast Server may replace the existing quote with the new one so as to avoid having both quotes on the carousel at the same time. Though sequence numbers can be used to accomplish the goal of ensuring that the client doesn't use the old quote, that would result in an inefficient use of bandwidth since both the old and new quote are stored and broadcast.

Note that the Broadcast Server and Broadcast Client Toolkit can provide additional content delivery assistance to certain types of applications. Such assistance may include full and incremental state management. Certain types of applications send frequent update events that are modifications to some relatively static state. The update events are small compared to the complete application state. The complete application state remains relatively static, where only small portions of it change as updates are generated. Examples of such applications include broadcast sporting events, real-time election results, and commuter schedules and status. For sporting applications, the frequent updates would be individual plays, scoring changes, or player substitutions. The relatively static state would be the entire game state, such as scoreboard, current players, and team summaries. For election results, the frequent updates would be vote counts for local candidates or issues. The relatively static state would be the number of republican or democratic seats won nationally, or local predicted results. For commuter schedules, frequent updates would include actual train, bus, or flight arrival or departure times. The relatively static state would be the train, bus, or plane schedule itself.

A common issue that may need to be addressed with such applications is dealing with clients that join the network in the middle of the broadcast, or clients that temporarily stop listening to the broadcast and attempt to rejoin later. Such clients need to obtain a complete version of the current state of the application, and start monitoring new update events. The updates typically aren't meaningful without a baseline, and the baseline in and of itself isn't enough to bring the client completely up to date. Without careful planning, it may take a long time, or be impossible for the client to catch up since it needs to obtain the baseline application state as well as track all relevant updates.

The methodology used to broadcast complete state and update (incremental) events is somewhat dependent on the bandwidth available to the application. For example, when more bandwidth is available, the complete state can be broadcast more frequently, and update events can contain all changes since the last complete state. When bandwidth is limited, the complete state may not be sent as often, and update events typically would be kept small. In such a case, the update events may only contain a single update, and rely on the successful receipt of all prior update events. The Broadcast Server and Broadcast Client Toolkit can provide optimization of the process based on the current bandwidth available without the need for the application to react to bandwidth changes itself. The Broadcast Server can then determine the best way to deliver the complete state and update event information.

When a client application starts receiving an event stream, it may take some time to reconstitute enough state information to begin operating normally. There may also be cases where a client application falls behind and can not operate normally due to network or other client specific conditions. In such cases, it may be desirable to have the client interactively update itself with a point-to-point connection to the Broadcast Server so that it can be brought up to date more quickly. If available, this feature should be properly supported so as to avoid situations where a large number of clients attempt this repair at the same time, causing the network to be overrun with such requests. One way to accomplish this would be to have the application event stream contain information that indicates when it is acceptable for clients to attempt an interactive update. This feature may also be limited to premium subscribers, where additional fees justify the additional demands placed on the network.

As is apparent from the preceding discussion of issues concerning incremental updates and state management, an issue that needs to be addressed in the environment in which the inventive system typically operates is that of dealing with clients that join the network in the middle of the broadcast of a sequenced set of data, or clients that temporarily stop listening to the broadcast and attempt to rejoin later. Such clients will typically need to obtain a complete version of the current state of the application, and also start monitoring the data broadcast for update events. Note that the updates typically aren't meaningful without a baseline, and the baseline in and of itself isn't enough to bring the client completely up to date.

The Broadcast Server and Broadcast Client Toolkit can provide an effective way to support such situations and ensure that a client joining the broadcast can quickly catch up and stay up to date throughout the broadcast. This alleviates the need for each application to devise its own mechanisms to deal with clients joining in the middle of the broadcast, or dropping and (re)joining during the broadcast. In one embodiment of the inventive system, this is accomplished by providing one broadcast session for the relatively static state, and another broadcast session for the update events. Clients joining or rejoining in the middle of the broadcast would then retrieve data from both sessions in order to build the current complete state of the application. Once up to date, clients will rarely use data from the state session since updates will be obtained from the update event session. For this reason, it typically makes sense to assign the update events session a higher priority in order to provide the best quality of service to the client application.

An application may define distinct data components that make up the full state of the application. Components can be added or removed during the broadcast event. These components can be defined in a hierarchical manner to better facilitate the removal of branches of components when desired. The collection of application defined components may be considered the relatively static state since update events will affect only one or a small number of components. When a component changes, the application would provide the new component's value to the Broadcast Server. The Broadcast Server would then broadcast the update over the higher priority update event session for a period of time, and broadcast the component over the lower priority data object session until a new update of that component is created by the application.

In accordance with this approach, Server-side applications would be expected to:
1. Define all components that make up the full application state;
2. Submit update events for components that change, indicating the component that changed and its new value; and
3. Add or remove application state components as necessary.

Similarly, client-side applications would be expected to:
1. Inform the Broadcast Client Toolkit (BCT) when it is out of date, and needs all state components as they are received; and
2. Inform the BCT when it is up to date, such that it only needs update events.

The Broadcast Server would then support the application by:
1. Creating a data object delivery session, with a low priority
   a. Place the latest version of each component on the data carousel;
2. Creating an event stream session
   a. Specify higher QoS parameters relative to the data object delivery session;
3. For each application component defined, store the latest version of that component
   a. Notify the BCT of new and deleted components; and
4. When a new update is posted:
   a. Replace the corresponding component from the data object deliver session
   b. Place the event on the event stream session.

Similarly, the Broadcast Client Toolkit would support the application by:
1. Setting up a table that, for each component, indicates the latest version of that component received by the client, where
   a. The table is constructed and maintained in the following way:
      i. If a component or event is received that has an identifier not already in the table, a new entry is added to the table
      ii. If an event is received that has a null value, the component will be removed from the table, along with any children if a hierarchy is defined;
2. Listen to both the data object session and the event stream session; and
3. When a component or update event is received:
   a. Note the version number and compare that to the version number in the table
   b. If the version number of the just received component or update event is newer than what is stored in the table for that component, or this event or component has not been received and the application has indicated that it is in an out of date state:
      i. Update the version number in the table
      ii. Forward the event or component to the client application.

As an example of the approach described, consider a baseball data cast application that provides daily scores and schedules, and real-time updates to baseball games currently being played. The baseball application needs to send various types of data:
Game schedule for the day
Information about each game
  If game has not started yet:
    Game time, location, ballpark conditions, starting lineup
  If game is over
    Final game summary, such as score, winning pitcher, game summary
  If game is in progress
    Current scoreboard
      Runs by inning, total runs, hits and errors
    inning summary
      Current pitcher, men on base, number of outs, previous batter results
    at-bat summary
      Individual pitch locations, current count, current batter.

The full state of the baseball application includes the data listed above, but at any moment in time, only certain portions of the data may change. To accommodate this situation, the baseball application can define the following components:
Daily game schedule record
Game record for each game scheduled for the day
  If the game has not started, this record will contain game information such as game time, location, ballpark conditions, starting lineup
  If the game is over this record will contain a final game summary such as score, winning pitcher, and game highlights
  If the game is in progress, this record will contain the current game scoreboard with runs by inning, total runs, hits and errors
An inning summary for each game in progress
An at-bat summary for each game in progress.

At application startup, the baseball application would define the daily game schedule component, and a component for each game of the day. As various ballgames begin and end, the baseball application will add or remove inning and at-bat summary components. After component setup, the baseball application would then provide the Broadcast Server with new component values as they change. The Broadcast Server and Broadcast Client Toolkit would work together using the methods described to ensure that clients can become up to date as they join the broadcast, and stay up to date with the latest information for all games.

A client-server architecture for the distribution of events and data to client devices operating in a network has been described. The system uses a broadcast mode of data transfer to distribute notifications, events, and other forms of data to the client devices, typically by means of broadcasting over a wireless network. Applications register with the server to provide events/data, while application executing on the client devices register to receive those events/data. The system includes processes for the allocation of bandwidth to applications and data broadcasting sessions, where the initial allocation may be modified by the system in accordance with defined bandwidth constraints and relationships to permit applications needing additional bandwidth to operate more effectively. The system also includes processes to permit the Quality of Service metrics of importance to an application to be maintained or subject to minimal impact when bandwidth is reallocated.

Among other features, benefits, and advantages, the inventive system provides:

Dynamic event scheduling—the ability to change the rate at which events are sent for each application session based on current application activity. This involves assigning event priority in real-time for all events from multiple application sessions, and is described with reference to the Event Scheduler element;

The ability for multiple client applications to receive events from the same source. This eliminates the need to send the same event stream to multiple client applications, reducing bandwidth consumption;

Effective abstraction of the broadcast network transmission details from the applications using the broadcast network, such as bandwidth requirements, packet size, FEC, and retransmission;

A Quality of Service degradation methodology. This provides applications the ability to specify how to handle the event stream when the effective bandwidth gets reduced, by specifying parameters such as latency, FEC, and number of rebroadcasts. This feature is described with reference to the Quality of Service discussion; and An adaptive bandwidth reallocation process that reallocates bandwidth from applications that don't require their current bandwidth to maintain their current quality of service to applications that could use additional bandwidth to support their current quality of service.

Although in one embodiment, the present invention has been described in the context of broadcasting data or events to a mobile device operating in a wireless network, it is to be understood that it may be utilized in other contexts as well. For example, the inventive system, apparatus, and methods may be utilized in a "simulcast" point-to-point case mode of data transfer, where a network operator is interested in controlling the bandwidth usage of each client-server connection. In such a case, the bandwidth allocation and adaptation methods described herein would be applicable and beneficial since in some situations, multiple applications could be contending for the same limited point-to-point resource for each device receiving the simulcast.

Further, whether using a broadcast mode or point-to-point mode of data transfer, the present invention may be utilized with a range of mobile, semi-mobile, or fixed location devices, including, but not limited to, mobile phones, PDAs, smart phones, laptop computers, information kiosks, ATM machines, etc. Similarly, the present invention may be used with wireless or wired networks, such as mobile phone networks, or fixed high speed bidirectional networks, such as the Internet. In addition, the resource allocation methods described herein may be used to allocate bandwidth and/or to establish or control a desired level of quality of service for an application or group of applications in the context of broadcast or point-to-point data transfer, and with any of the types of client devices or networks described.

It should be understood that certain elements of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method for distributing events associated with a datacast application, the method comprising:
receiving a registration of at least one application including a specification of a level of delivery quality of service corresponding to the application and a specification of a maximum priority level corresponding to the application, the maximum priority level selected from an ordered plurality of priority levels;
opening a plurality of event sessions requested by the application including associating each of the plurality of event sessions with one of a plurality of distinct session priority levels specified by the application, each of the specified plurality of distinct session priority levels being restricted so as not to exceed the maximum priority level specified for the application; and
for each of the plurality of event sessions, at least:
converting the level of the delivery quality of service to an expected bandwidth for the event session; a bandwidth requirement;
allocating bandwidth to the event session based at least in part on the expected bandwidth for the event session and the associated session priority level for the event session;
receiving a publication of at least one event object associated with the event session;
responsive to receiving the publication of the at least one event object, generating a plurality of data packets corresponding to a segmentation of the event object, wherein the data packets are generated at a rate corresponding to the bandwidth allocated to the event session; and requirement; and
transmitting the data packets of the event object to at least one client device over a broadcast or multicast communication network.

2. The method of claim 1, further comprising:
registering the application on the client device;
receiving a data stream including the data packets at the client device;
assembling the data packets, wherein the assembled data packets are used to reconstruct each event object; and
delivering each event object to the application executing on the client device.

3. The method of claim 2, wherein transmitting the data packets comprises transmitting the data packets more than once such that different client devices receive the data stream at different times and each client device acquires each event object.

4. The method of claim 2, wherein transmitting the data packets comprises retransmitting previously transmitted data packets that are used by the client device to acquire each event object.

5. The method of claim 1, further comprising: reallocating bandwidth to a plurality of applications.

6. The method of claim 5, wherein the allocated bandwidth corresponds to a value equal to or greater than a minimum guaranteed bandwidth and equal to or less than a maximum usable bandwidth.

7. The method of claim 5, wherein an amount of the allocated bandwidth is dependent on a total available bandwidth for allocation and bandwidth requirements of other applications.

8. The method of claim 5, wherein an amount of the allocated bandwidth changes in response to publication of high priority event objects.

9. The method of claim 5, wherein the bandwidth reallocation occurs responsive to at least one of: publication of a new event object by an application; removal of an existing event object by an event scheduler: registration of a new application; deregistration of an existing application; creation, destruction or modification of sessions by an application; and modification of overall bandwidth configuration.

10. The method of claim 1, wherein application registration is prevented when available bandwidth cannot be allocated to satisfy the level of the delivery quality of service for all applications.

11. The method of claim 10, further comprising:
modifying the level of delivery quality of service; and
registering the application with the modified level of delivery quality of service.

12. The method of claim 1, wherein one of the data streams is identified by the application as a data object delivery session.

13. The method of claim 1, wherein one of the data streams is identified by the application as an event stream session.

14. The method of claim 1, wherein one of the data streams is identified by the application as a notification session.

15. The method of claim 1, wherein the level of delivery quality of service is determined based on at least one of: data size for a session, event frequency, event size, event acquisition time and event delivery reliability.

16. The method of claim 1, further comprising: calculating the expected bandwidth for the event session based at least in part on bandwidth at least one of: event size, event frequency, event latency time, an error correction requirement, session priority, and a number of re-transmissions.

17. The method of claim 16, wherein the expected bandwidth for the event session is calculated at different levels of delivery quality of service and is further based at least in part on, at least one of: an expected quality of service, a minimum guaranteed quality of service, and maximum usable quality of service or bandwidth.

18. The method of claim 16, wherein calculating the expected bandwidth for the event session bandwidth requirement comprises:
determining an amount of data to be transmitted to the client device using a product of the event size, the event frequency and the number of re-transmissions;
multiplying the determined amount of data by an error correction factor to generate a corrected amount of data; and
dividing the corrected amount of data by an event latency value to generate the expected bandwidth for the event session.

19. The method of claim 1, further comprising: caching the event object on the client device.

20. The method of claim 19, wherein the event object is cached at a location that is monitored by the application executing on the client device.

21. A datacasting system for event broadcasting distribution of a plurality of applications, the system including a broadcast server comprising:
a register element for registering an application with a level of delivery quality of service corresponding to the application and a maximum priority level corresponding to the application, the maximum priority level selected from an ordered plurality of priority levels, the application configured at least to request that the broadcast server open a plurality of event sessions requested by the application and associate each of the plurality of event sessions with one of a plurality of distinct session priority levels specified by the application, the broadcast server limiting each of the specified plurality of distinct session priority levels to the maximum priority level specified for the application, and wherein, for each of the plurality of event sessions, the level of delivery quality of service is converted to an expected bandwidth for the event session;
a bandwidth allocation element for allocating bandwidth to the plurality of event sessions based at least in part on the expected bandwidths for the plurality of event sessions and the associated session priority levels for the plurality of event sessions;
a publication element for accepting publication of at least one event object associated with at least one of the plurality of event sessions;
a packet generator for generating a plurality of data packets corresponding to a segmentation the event object, wherein the data packets are generated at a rate corresponding to the bandwidth allocated to at least one of the plurality of event sessions with which the event object is associated; and
a network communication element for formatting the data packets for transmission over a communication network.

* * * * *